United States Patent
Glover et al.

(10) Patent No.: US 10,002,113 B2
(45) Date of Patent: Jun. 19, 2018

(54) ACCESSING RELATED APPLICATION STATES FROM A CURRENT APPLICATION STATE

(71) Applicant: Samsung Electronics Co., Ltd., Suwon-si, Gyeonggi-do (KR)

(72) Inventors: Eric J. Glover, Palo Alto, CA (US); Michael Travers, Pacifica, CA (US); David Hytha, Oakland, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 14/980,363

(22) Filed: Dec. 28, 2015

(65) Prior Publication Data

US 2016/0188543 A1   Jun. 30, 2016

Related U.S. Application Data

(60) Provisional application No. 62/098,175, filed on Dec. 30, 2014.

(51) Int. Cl.
G06F 17/00 (2006.01)
G06F 17/22 (2006.01)
G06F 17/30 (2006.01)

(52) U.S. Cl.
CPC ...... *G06F 17/2235* (2013.01); *G06F 17/3087* (2013.01)

(58) Field of Classification Search
CPC .............................. G06F 17/2235; H04L 67/28
See application file for complete search history.

(56) References Cited

U.S. PATENT DOCUMENTS

| 7,634,259 B2 * | 12/2009 | Shienbrood .................. 455/418 |
| 8,041,763 B2 * | 10/2011 | Kordun ............ G06F 17/30884 709/203 |
| 9,398,069 B2 * | 7/2016 | Bishop ................... H04L 67/02 |
| 2005/0022157 A1 * | 1/2005 | Brendle ................. G06F 9/485 717/104 |
| 2012/0005024 A1 | 1/2012 | Fernandez Gutierrez |
| 2012/0150630 A1 | 6/2012 | Hicken et al. |
| 2012/0253939 A1 | 10/2012 | Grigoriev et al. |
| 2013/0311285 A1 | 11/2013 | Abrol et al. |
| 2014/0074601 A1 | 3/2014 | Delug |

(Continued)

FOREIGN PATENT DOCUMENTS

JP   2012173885 A   9/2012

OTHER PUBLICATIONS

PCT International Search Report and Written Opinion, PCT Application No. PCT/US2016/027775, dated Jul. 22, 2016, 13 pages.

Primary Examiner — Amelia Tapp
(74) Attorney, Agent, or Firm — Jefferson IP Law, LLP

(57) ABSTRACT

A method includes receiving a link request from a remote device, the link request indicating an entity name and an action. The method further includes retrieving an application state record, the application state record indicating an entity name matching to the entity name of the link request and indicating a different action than the action of the link request. Additionally, the method further includes generating a link result based on the retrieved application state record and transmitting the link result to the remote device. The link result is configured to be displayed as a user-selectable link.

20 Claims, 14 Drawing Sheets

(56) References Cited

U.S. PATENT DOCUMENTS

| | | |
|---|---|---|
| 2014/0172563 A1 | 6/2014 | Amit et al. |
| 2014/0250106 A1 | 9/2014 | Shapira et al. |
| 2014/0258013 A1 | 9/2014 | Collins et al. |
| 2014/0316890 A1 | 10/2014 | Kagan |

\* cited by examiner

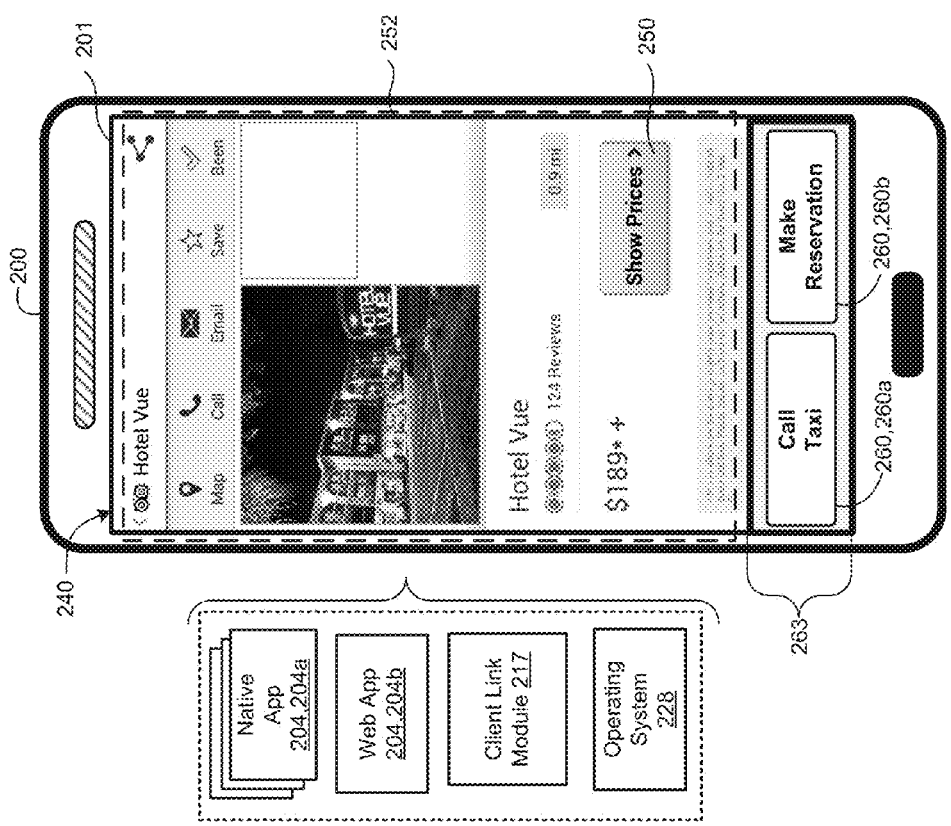

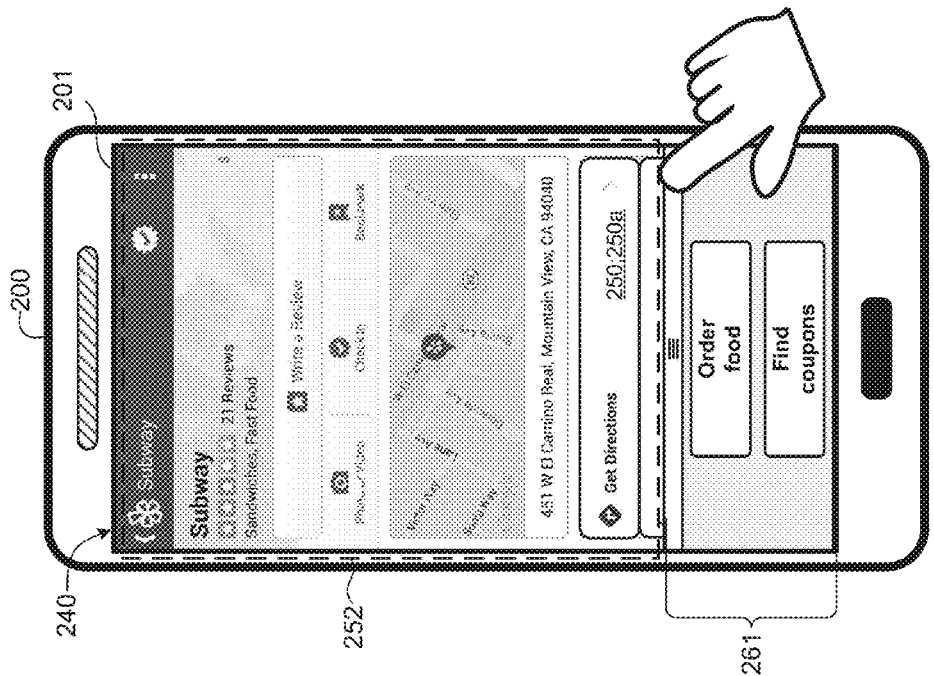
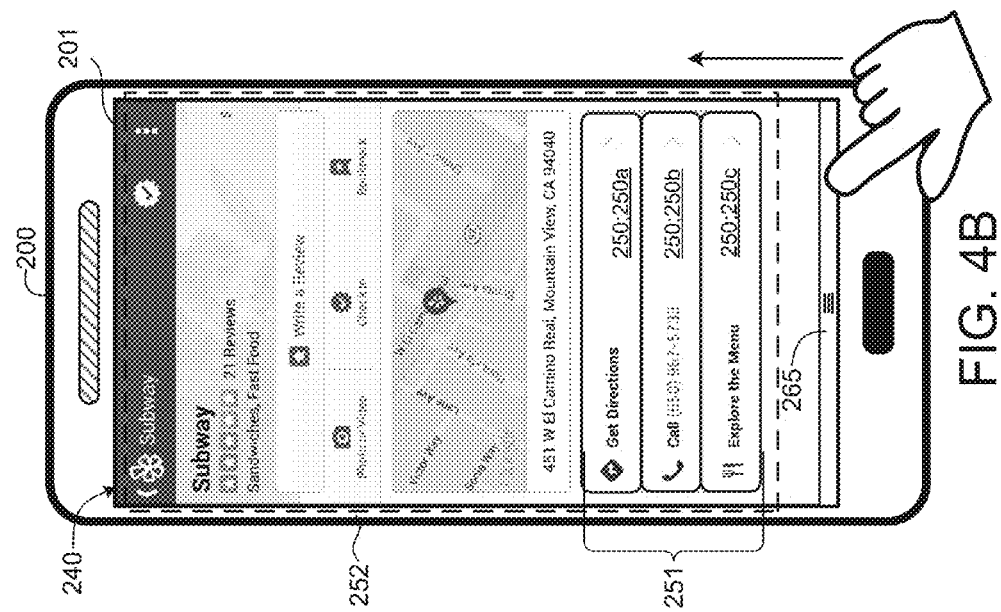
FIG. 4C
FIG. 4B

ACCESSING RELATED APPLICATION STATES FROM A CURRENT APPLICATION STATE

CROSS REFERENCE TO RELATED APPLICATIONS

This U.S. patent application claims priority under 35 U.S.C. § 119(e) to U.S. Provisional Application 62/098,175, filed on Dec. 30, 2014, which is hereby incorporated by reference in its entirety.

TECHNICAL FIELD

This disclosure relates to accessing actions not otherwise available to an application.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications to games, educational applications, news applications, shopping applications, messaging applications, media streaming applications, social networking applications, and so much more. Furthermore, application developers develop vast amounts of applications within each genre and each application may have numerous editions. As a result, users of these Internet-connected devices have encountered the problem of finding the correct native or web software application offering the information and/or functionality that they seek. In response to this problem, techniques have arisen to connect users of these devices to relevant application and web content.

SUMMARY

The details of one or more implementations of the disclosure are set forth in the accompanying drawings and the description below. Other aspects, features, and advantages will be apparent from the description and drawings, and from the claims.

In one example, the present disclosure is directed to a method comprising receiving, at a processing system of one or more processors, a link request from a remote device, the link request indicating an entity name and an action. The method further comprises retrieving an application state record from a data store based on a match between the entity name of the link request and an entity name indicated by the application state record, the application state record indicating a different action than the link request. Additionally, the method further comprises generating a link result based on the retrieved application state record and transmitting the link result to the remote device. The link result is configured to be displayed as a user-selectable link.

In another example, the present disclosure is directed to a system comprising one or more computing devices and a data store. The data comprises one or more storage devices. The one or more computing devices include one or more processing units that execute computer-readable instructions, the computer-readable instructions, when executed by the one or more processing units, cause the one or more computing devices to receive a link request from a remote device, the link request indicating an entity name and an action. The one or more computing devices are further configured to retrieve an application state record from the data store based on a match between the entity name of the link request and an entity name indicated by the application state record, the application state record indicating a different action than the link request. Additionally, the one or more computing devices are further configured to generate a link result based on the retrieved application state record and transmit the link result to the remote device. The link result is configured to be displayed as a user-selectable link.

In another example, the present disclosure is directed to a method comprising receiving, at a processing system of one or more processors, a link request from a remote device, the link request indicating an entity name and an action. The method further comprises determining an application state record based on a match between the entity name of the link request and an element of an action ontology, the elements of the action ontology indicating actions associated with the entity name of the link request. Additionally, the method further comprises generating a link result based on the determined application state record and transmitting the link result to the remote device. The link result is configured to be displayed as a user-selectable link.

DESCRIPTION OF DRAWINGS

FIGS. 3A-4C are schematic views of an example user device displaying state links.

Like reference symbols in the various drawings indicate like elements.

DETAILED DESCRIPTION

The present disclosure relates to enhancing a state of an application by providing access to actions that may not otherwise be accessible by that application state. For example, a user accessing an application state on a user device may be provided one or more user-selectable links to related application states (hereafter "state links") within or adjacent to the currently accessed state.

A link generation system of the present disclosure generates one or more state links in response to a link request received from a user device. The link request may indicate an entity (e.g., a person, place, or thing) and an action (e.g., a task performed by the corresponding application state) associated with a state currently being accessed by the user device. The link generation system generates link results corresponding to the same entity but different actions than indicated by the link request. The link generation system transmits the link results to the user device. The user device may display the link results as one or more user-selectable state links that are associated with the same entity as the currently accessed application state, but that perform different actions than the currently accessed application state.

Figure 1A:
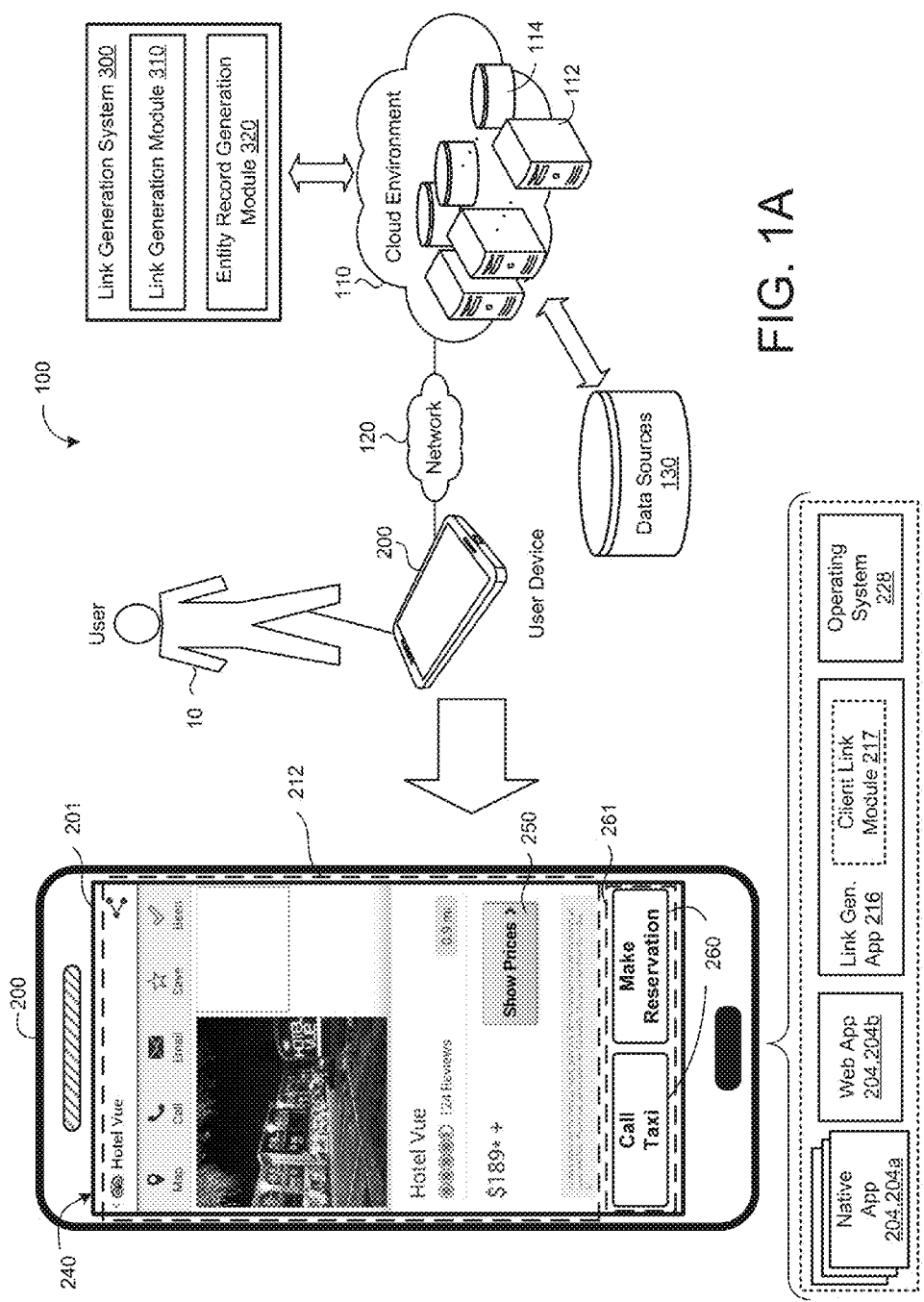
FIG. 1A is a schematic view of an example environment including a user device in communication with a link generation system.

FIG. 1A illustrates an example link generation system and an example user device according to the present disclosure. In FIG. 1A, a travel application (e.g., the application TRI-PADVISOR®, developed by TripAdvisor, Inc.) may include an application state that provides a link to the action "show prices" that, when selected by a user, causes the user device to display a price listing of the cost to stay at a particular hotel (e.g., Hotel Vue). In this example, the entity indicated by the link request is Hotel Vue and the action indicated by the link request is "show prices." Based on this entity and action, the link generation system can provide state links to application states associated with the same entity but different actions. More specifically, as depicted by the example of FIG. 1A, the link generation system provides state links that allow a user of the user device to call a taxi to Hotel Vue and/or to make a reservation at Hotel Vue, both of which are actions that the user could not otherwise access in the current application state. By generating state links using the same entity but different actions than a currently accessed application state, the link generation system allows users to access related actions that may otherwise be inaccessible in the currently accessed application state.

The user device includes a client link module configured to communicate with the link generation system. In some examples, the client link module may be a component of a native application. In these examples, a developer of a native application may utilize a software development kit (SDK) to implement a client link module as part of their application. In these examples, the client link module may execute within (e.g., as a part of) a native application. In other examples, the client link module may execute separately from native applications installed on a user device. For example, an application launcher (hereafter "launcher") may include a client link module configured to communicate with the link generation system separately from native applications installed on the user device. A launcher may be a program that helps users locate, launch, navigate through, and organize applications on a user device. In some examples, a launcher may serve as an interface between a user and an operating system, such as by providing a graphical user interface that allows the user to access applications and functionality of the operating system. In examples where a launcher includes the client link module, the client link module may run in the background (e.g., execute on the user device but not be displayed graphically) and provide state links in response to certain events (e.g., a user swipe upwards from the bottom of the user device's display, causing an overlay containing state links to appear).

Figure 2:
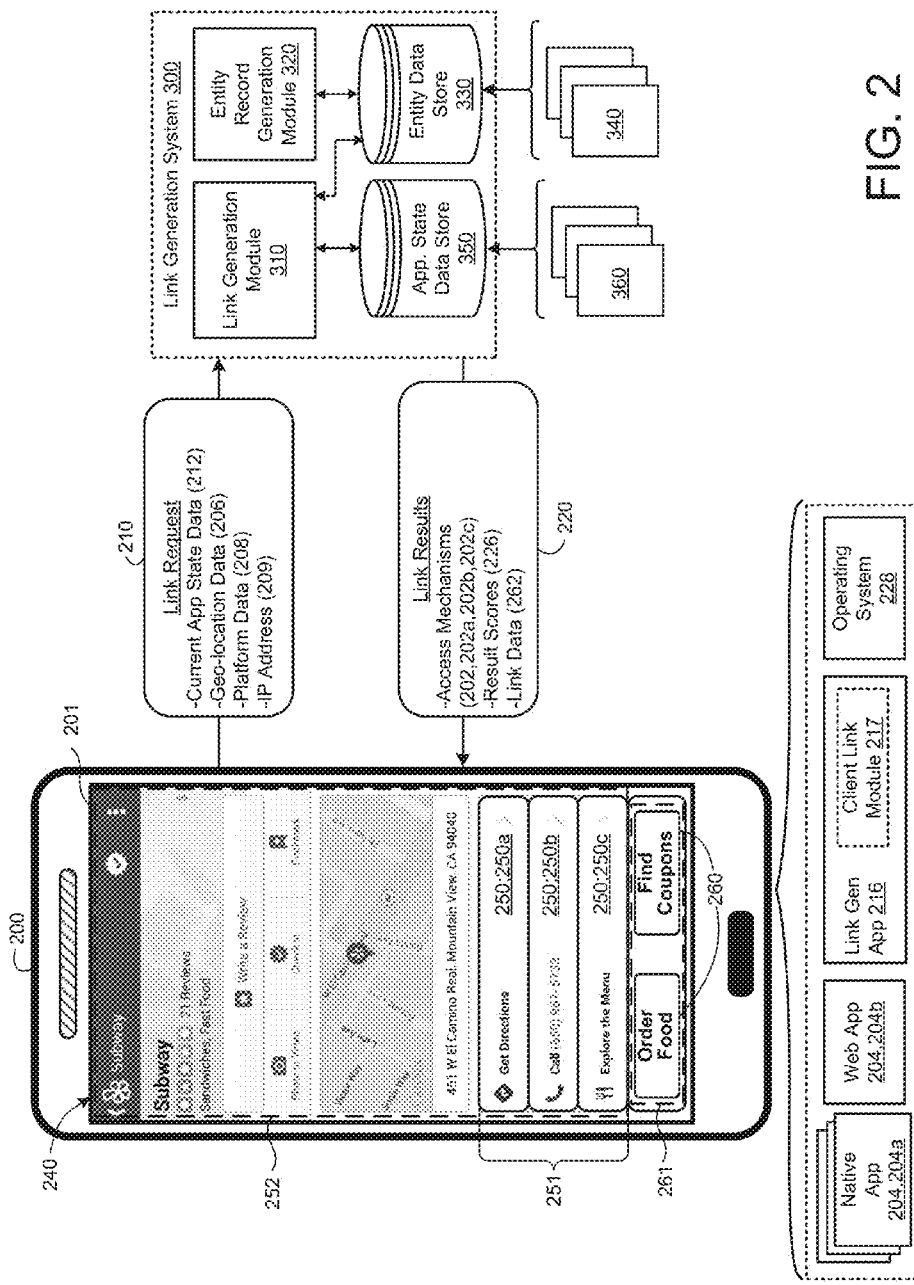
FIG. 2 is a schematic view of an example user device in communication with a link generation system.

FIG. 2 illustrates an example link generation system 300 in communication with a user device 200. The link generation system 300 may include a link generation module 310, an entity record generation module 320, and an entity data store 330. In some implementations, the link generation system 300 may additionally include an application state data store 350. The application state data store 350 and the entity data store 330 may include one or more databases, indices (e.g., inverted indices), tables, files, or other data structures, which may be used to implement the techniques of the present disclosure. The link generation module 310 may generate application state records 360 and store the application state records 360 in the application state data store 350. The entity record generation module 320 generates entity records 340 and stores the entity records 340 in the entity data store 330.

The link generation system 300 receives a link request 210 from a user device 200 and generates link results 220 (e.g., link data 262 and corresponding access mechanisms 202). The link request 210 may include current application state data 212 describing the current application state 252 being accessed by the user device. The link generation module 310 may retrieve an entity record 340 from entity data store 330 based on the entity indicated by the current application state data 212. The retrieved entity record 340 may indicate application states that are associated with the same entity as the current application state 252 of the link request 210. The link generation system 300 may select one or more of the application states indicated by the retrieved entity record that are associated with a different action than the current application state 252 for inclusion in the link results 220. In some implementations, the link generation module 310 may additionally access the application state data store 350 to retrieve application state records 360 corresponding to the application states indicated by the retrieved entity record. Additionally or alternatively, the link generation module 310 may access the application state data store 350 based information in the link request 210. The link generation module 310 generates link results 220 based on the data of the retrieved entity record 340 and one or more application state records 360. The link generation system 300 configures the link results 220 to be capable of render and display by the user device 200 as user-selectable state links 260.

Figure 1B:
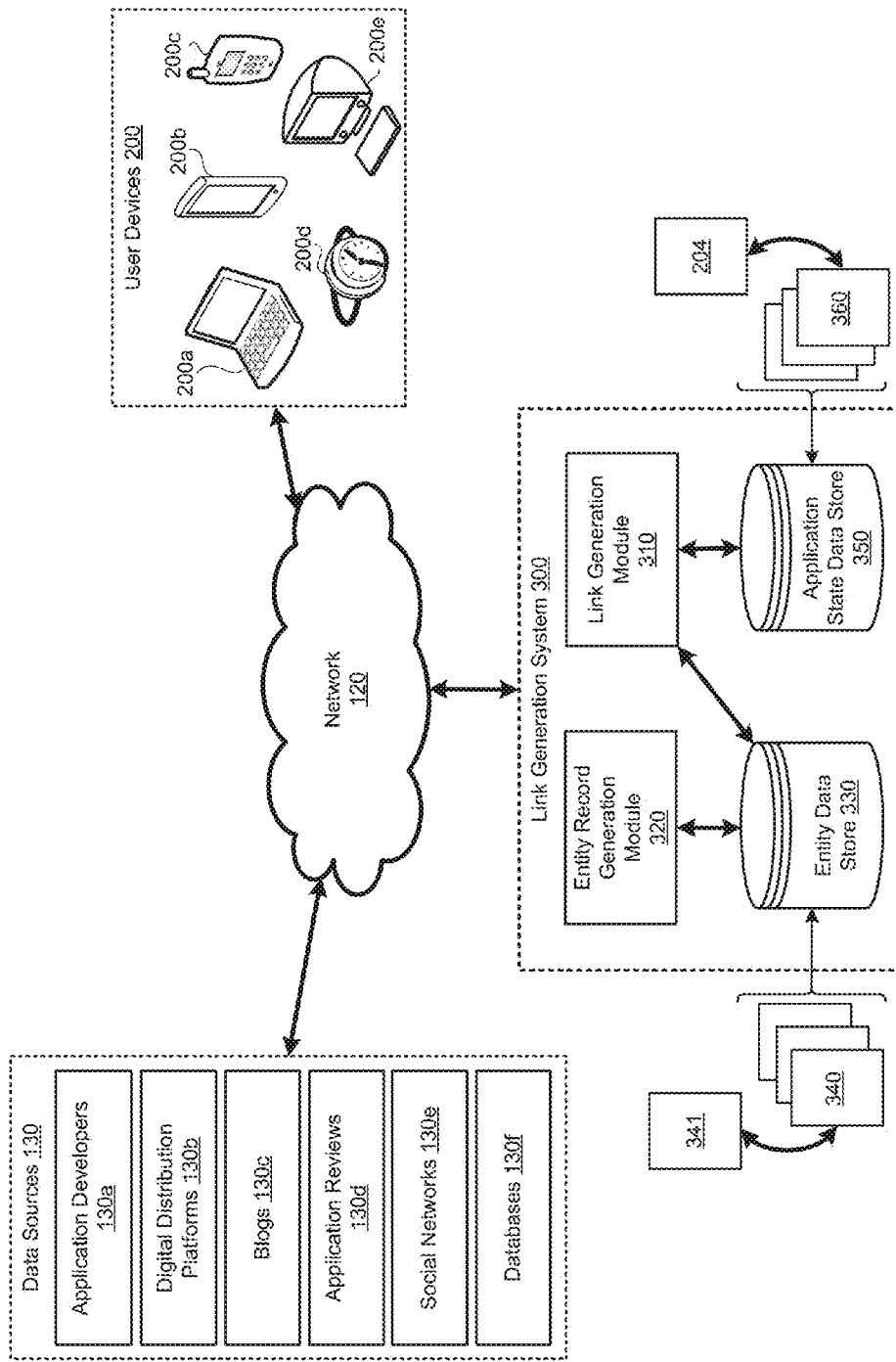
FIG. 1B is a functional block diagram of a link generation system interacting with user devices and data sources.

FIG. 1A illustrates an example environment 100 that includes a user device 200 associated with a user 10 in communication with a remote system 110 via a network 120. FIG. 1B provides a functional block diagram of the environment 100. The remote system 110 may be a distributed system (e.g., cloud environment) having scalable/elastic computing resources 112 and/or storage resources 114. The user device 200 and/or the remote system 110 may execute a link generation system 300, and optionally receive data from one or more data sources 130. In some implementations, the s link generation system 300 communicates with one or more user devices 200 and the data source(s) 130 via the network 120. The network 120 may include various types of networks, such as a local area network (LAN), wide area network (WAN), and/or the Internet.

FIGS. 1A-2 show an example user device 200 in communication with the link generation system 300. User devices 200 can be any computing devices that are capable of providing current application state data 212 in a link request 210 to the link generation system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

User devices 200 may use a variety of different operating systems 228. In examples where a user device 200 is a mobile device, the user device 200 may run an operating system 228 including, but not limited to, ANDROID® developed by Google Inc., IOS® developed by Apple Inc., or WINDOWS PHONE® developed by Microsoft Corporation. Accordingly, the operating system 228 running on the user device 200 may include, but is not limited to, one of ANDROID®, IOS®, or WINDOWS PHONE®. In an example where a user device 200 is a laptop or desktop computing device, the user device 200 may run an operating system 228 including, but not limited to, MICROSOFT WINDOWS® by Microsoft Corporation, MAC OS® by Apple, Inc., or Linux. User devices 200 may also access the link generation system 300 while running operating systems 228 other than those operating systems 228 described above, whether presently available or developed in the future.

A native application 204 (e.g., a software application) may refer to computer software that, when executed by a computing device, causes the computing device to perform a task. In some examples, a native application 204 may be referred to as an "application", an "app", or a "program". Example software applications 204 include, but are not limited to, word processing applications, spreadsheet applications, messaging applications, media streaming applications, social networking applications, and games.

A user device 200 may include a launcher. A launcher may include a set of computer-readable instructions that are executed by a user device 200 to launch and/or navigate through native applications. A launcher may be included in an operating system of a user device 200. Alternatively, a launcher may be provided by a third-party developer and can be installed by a user of the user device 200. In other words, the launcher may itself be a native application. Launching a native application may refer to retrieving computer-readable instructions corresponding with the native application from a memory of the user device 200 and executing the computer-readable instructions at a computing processor.

Applications 204 can be executed on a variety of different user devices 200. In some examples, a native application 204a may be installed on a user device 200 prior to a user 10 purchasing the user device 200. In other examples, the user 10 may download and install native applications 204a on the user device 200. Native applications 204a can perform a variety of different actions for a user 10. For example, a restaurant reservation application can make reservations for restaurants. As another example, an internet media player application can stream media (e.g., a song or movie) from the Internet. In some examples, a single native application 204a can perform more than one action. For example, a restaurant reservation application may also allow a user 10 to retrieve information about a restaurant and read user reviews for the restaurant in addition to making reservations. As another example, an internet media player application may also allow a user 10 to perform searches for digital media, purchase digital media, and generate media playlists.

The user 10 may access an application 204 on the user device 200 on which the application 204 is installed. Additionally or alternatively, the user 10 may access an application 204 via a remote computing device. In some examples, all of an application's operations are included on the user device 200 on which the application 204 is installed. These applications 204 may operate without communication with other computing devices (e.g., via the Internet). In additional examples, an application 204 installed on a user device 200 may access information from other remote computing devices during operation. For example, a weather application installed on a user device 200 may access the latest weather information via the Internet and display the accessed weather information to the user 10 through the installed weather application. In further examples, an application 204 (e.g., a web-browser application 204b) may be partially executed by the user device 200 and partially executed by a remote computing device 300. For example, a web-browser application 204b may be an application 204 that is executed, at least in part, by a web server and accessed by a web browser of the user device 200. Example web applications 204b may include, but are not limited to, web-based email, online auctions, and online retail sites.

Referring to FIGS. 1A-2, the user device 200 may communicate with the link generation system 300 using any native application 204 configured to transmit a link request 210 to the link generation system 300 (hereafter "link generation application" 216). In some implementations, the link generation application 216 may be a third-party launcher. In some implementations, the link generation application 216 may refer to a launcher that is not necessarily a software application (e.g., a launcher executed via an operating system). The link generation application 216 may execute a client link module 217. The client link module 217 is in communication with the link generation module 300 via the network 120.

The client link module 217 is configured to monitor application states of applications 204 executing on a user device 200 and to transmit a link request 210 to the link generation system 300. The client link module 217 is also configured to receive link results 220 from the link generation module 300 and display (e.g., via the GUI 240) the link results 220 as user selectable state links 260. The client link module 217 transmits the link request 210 in response to an event. An event may be an "automatic" or "manual" event. Manual events may occur when a user intentionally manipulates the GUI 240 of the user device 200 or the user device 200 itself in order to cause transmission of a link request 210. For example, a manual event may occur (and thereby trigger a link request 210) when a user clicks on a button of the GUI 240 (e.g., a button labeled ") or swipes an element of" the GUI 240 (e.g., swipes the bottom of a page upwards). Automatic events may occur without a user's purposeful intervention and may be predefined by a system operator of the link generation system 300 and/or an application developer of a link generation application 216. For example, an automatic event may occur upon launch of an application 204 or upon scrolling through an application state. Both manual and automatic events may cause the client link module 217 to transmit a link request 210 based on a current application state 252. The link generation system 300 receives the The user device 200 (e.g., via the client link module 217) generates and displays user-selectable state links 260 based on link results 220 from the link generation system 300. The user-selectable state links 260 provide different actions than a current displayed application state 252. Each state link 260 may include an access mechanism 202. A user 10 may select a state link 260 by interacting with the state link 260 (e.g., touching or clicking the link). In response to selection of a state link 260, the user device 200 may launch a corresponding software application 204 (e.g., a native application 204a or a web-browser application 204b) referenced by the access mechanism 202 and perform one or more operations indicated in the access mechanism 202.

Referring to FIGS. 1A, 1B, and 2, in some implementations, the link generation system 300 includes a link generation module 310, an entity record generation module 320, an entity data store 330, and an application state data store 350. The link generation module 310 can receive a link request 210 and generate link results 220 based on data included in the entity data store 330 and the application state data store 350.

A link request 210 includes current application state data 212 that identifies a current application and application state being displayed by the GUI 240 of the user device 200. The current application state data 212 may include an entity of the current application state 252 and one or more actions of the current application state 252. In some implementations, the current application state data 212 includes a native application access mechanism 202a. In this way, the link generation system 300 may utilize the included application access mechanism 202 to retrieve a corresponding entity record 340 and/or application state record 360. In other implementations, the current application state data 212 may include a unique identifier that identifies the current application state (e.g., application state ID 362). In still other implementations, the current application state data 212 includes an application ID 369 that identifies the application of the current displayed application state 252. The current application state data 212 may include other suitable information related to a state being accessed by the user device 200.

The link request 210 may include additional data along with the current application state data 212. In some examples, the link request 210 may include a "black list" or a "white list." In these examples, the black and/or white lists may correspond to applications, entities, and/or actions to which a developer of a current application state 252 may not (in the case of a black list) or may want (in the case of a white list) provided in state links. For example, the link request 210 may include a list of applications. In these examples, the list of applications may indicate applications to which a developer associated with the current application state 252 may not want to include state links (e.g., a "black list" of applications to which a developer does not want state links). Additionally or alternatively, the list of applications may indicate applications to which the state links may provide access (e.g., a "white list" in the scenario where a developer associated with the current application state 252 only wants to include state links to other applications developed by the developer). In some implementations, an application developer or third party associated with an application may provide a black list and/or white list a system operator of the link generation system 300 separately from a link request 210 (e.g., in advance of the link request). In this way, the link generation system 300 may store data related to the black and/or white lists and provide link results accordingly.

Returning to additional data provided in a link request 210, in one example, the link request 210 may include a number of requested state links 260. For example, the link request 210 may request a maximum of three state links 260. In another example, the link request 210 may request state links 260 that perform a specific action or actions. For example, the link request 210 may request state links 260 associated with the "make reservation" action. In another example, the link request 210 may include geo-location data 206 that indicates a location of the user device 200, such as latitude and longitude coordinates. The user device 200 may include a global positioning system (GPS) receiver that generates the geo-location data 206 transmitted in the link request 210. The link request 210 may also include an IP address 209, which the link generation module 310 may use to determine the location of the user device 200. In some examples, the link request 210 may also include additional data, including, but not limited to, platform data 208 (e.g., version of the operating system 228, device type, and web-browser version), an identity of a user 10 of the user device 200 (e.g., a username), partner specific data, and other data.

The link generation module 310 receives the current application state data 212 and identifies other application states that are associated with the same entity 341 as the current displayed application state 252, but perform different actions than the current displayed application state 252. The link generation module 310 identifies application states by accessing the entity data store 330 and, in some implementations, the application state data store 350. In some implementations, the link generation module 310 may retrieve an entity record 340 from the entity data store 330 based on data included in the link request 210 (e.g., an entity indicated by the current application state data 212). In some implementations, the link generation module 310 may additionally or alternatively retrieve one or more application state records 360 from the application state data store 350 based on data included in the link request 210 (e.g., current application state data 212) and/or the retrieved entity record 340. The retrieved entity record 340 (FIGS. 5A and 5B) may include data related to its corresponding entity (i.e., the entity of the link request 210) such as entity information 344 and data related application states corresponding to the entity (e.g., access mechanisms 202). In some implementations, the application state records 360 retrieved by the link generation module 310 may correspond to the application states indicated by the entity record 340 and may also include one or more access mechanisms 202. In addition, each application state record 360 includes additional information relating to its corresponding application state (discussed below with respect to FIGS. 5C and 5D). The link generation module 310 may utilize the data included in the entity records 340 and application state records 360 to generate link data 262 to be included in the link results 220. The link generation module 310 may additionally include access mechanisms 202 from the retrieved records 340, 360 corresponding to the generated link data 262 in the link results 220.

In some implementations, the link generation module 310 may identify more application states than requested by the link request 210. In these examples, the link generation module 310 may select between identified entity records 340 and their corresponding application state records 360. In other words, the link generation module may select between identified application states that satisfy the link request 210. The link generation module 310 may use data associated with the selected application states (e.g., entity records and their corresponding application state records) to generate the link results 220. The link generation module 310 may select between identified application states in a variety of ways. In some examples, the link generation module 310 may generate a relevance score 226 indicating the relative relevance of an identified application state. For example, the link generation module 310 may perform text-based matching between the contents of the link request 310 and the retrieved records 340, 360 corresponding to the identified application states. In this example, the link generation module 310 may grant larger relevance scores 226 to identified application states with a higher percentage of text matches, and lower relevance scores 226 to identified application states with a lower percentage of text matching. In other examples, the link generation module 310 may filter out identified application states based on additional data included in the link request 210 such as a requested action, a requested application, and/or geo-location data. In these examples, the link generation module 310 may filter out application states that do not satisfy the additional data of the link request 210. For example, the link generation module 310 may filter out identified application states corresponding to an entity outside of a specified distance of the geo-location in the link request 210. In another example, the link generation module 310 may filter out application states that do not match the requested action or requested application of the link request 210. In some examples, the link generation module 310 may filter out application states to include based on a predefined list of applications corresponding to the current application state 252. For example, an application developer associated with the current application state 252 may provide a list of acceptable (or unacceptable) software applications to which any state links 260 appearing in the current state 252 may (or may not) correspond. In a similar example, a system operator of the link generation system 310 may define a similar list of applications or application states that may or may not be provided by the link generation module 310 in response to particular current application states 252.

The entity data store 330 stores entity records 340, each associated with an entity 341. An entity 341 may refer to a person, place, or thing. For example, an entity 341 may refer to a business, product, service, media content, political organization/figure, public figure, destination, or any other suitable item of commerce, which may be advertised in connection with an application 204. For example, referring to the GUI 240 shown in FIG. 1A, the review application (e.g., TripAdvisor®) is associated with the entity 341 "Hotel Vue". The entity record generation module 320 generates entity records 340 (FIGS. 5A-5B) from the data sources 130 based on an entity 341 associated with a specific application state. An application state (e.g., accessed via an access mechanism 202) may perform actions related to an entity 341. Each entity record 340 may include data related to an entity 341. In some examples, an entity 341 is included in more than one application state.

In some implementations, an action ontology may be stored by the link generation system 300 in the form of a list of actions corresponding to application states. The link generation system 300 can use the action ontology to assign actions to the entity records 330 and application state records 360. For example, the link generation system 300 may include one or more modules (not shown) that can assign actions to application state records 360. As another example, the link generation system 300 may utilize the entity record generation module 310 and/or one or more modules (not shown) to assign actions to entity records. The action ontology may be defined by a system operator. In some examples, the system operator can create an action ontology specific to the link generation system 300. In other examples, the system operator may select actions from an existing ontology such as one provided by schema.org (maintained by Google, Inc., Yahoo, Inc., Microsoft Corporation, and Yandex). In this way, actions may be assigned to application states manually and/or automatically.

In some examples, application states may be marked up (e.g., tagged) with actions by third parties (e.g., application and/or website owners/developers other than those that operate the link generation system 300). In these examples, link generation system 300 can utilize the marked up actions to assign actions to application states. In other examples, the system operator may assign actions to application states and web pages at the application and domain level, respectively. For example, a food review application may be assigned the action "read review." The link generation system 300 may then assign the application-level action "read reviews" across every state of the food review application automatically. In a different example, the system operator may assign actions to application states and web pages individually (e.g. a sample size of different states/pages). The link generation system 300 can then assign actions to similar states in the application/website. For example, the system operator can manually assign the action "read review" to a state/page and replicate this assignment across other states/pages at the same level in the application/website (e.g., all states/pages related to reading reviews). More specifically, if the action related to the manually-assigned state/page relates to reading reviews about restaurants, any other states also related to reading reviews about restaurants will automatically be assigned the same action as the manually-assigned state/page. As another specific example, if a state/page of a movie database application/website relates to specific movie information, that state/page can be assigned the action "read movie information" manually by the system operator. The link generation system 300 may then apply the action "read movie information" across the rest of the states/pages of the movie database application/website that allow a user to view information related to a specific movie.

Example actions may include, but are not limited to: Navigate to a location, Find transportation to a location, Provide restaurant information, Order food from a restaurant, Provide food photos, Show menu, Find a business, Provide reviews of business, Provide food recipes, Send message, Check stocks, Check weather, Check sports scores, Play music, Play movie, Listen to radio station(s), Record video, Provide discount.

Figures 3A, 3B:
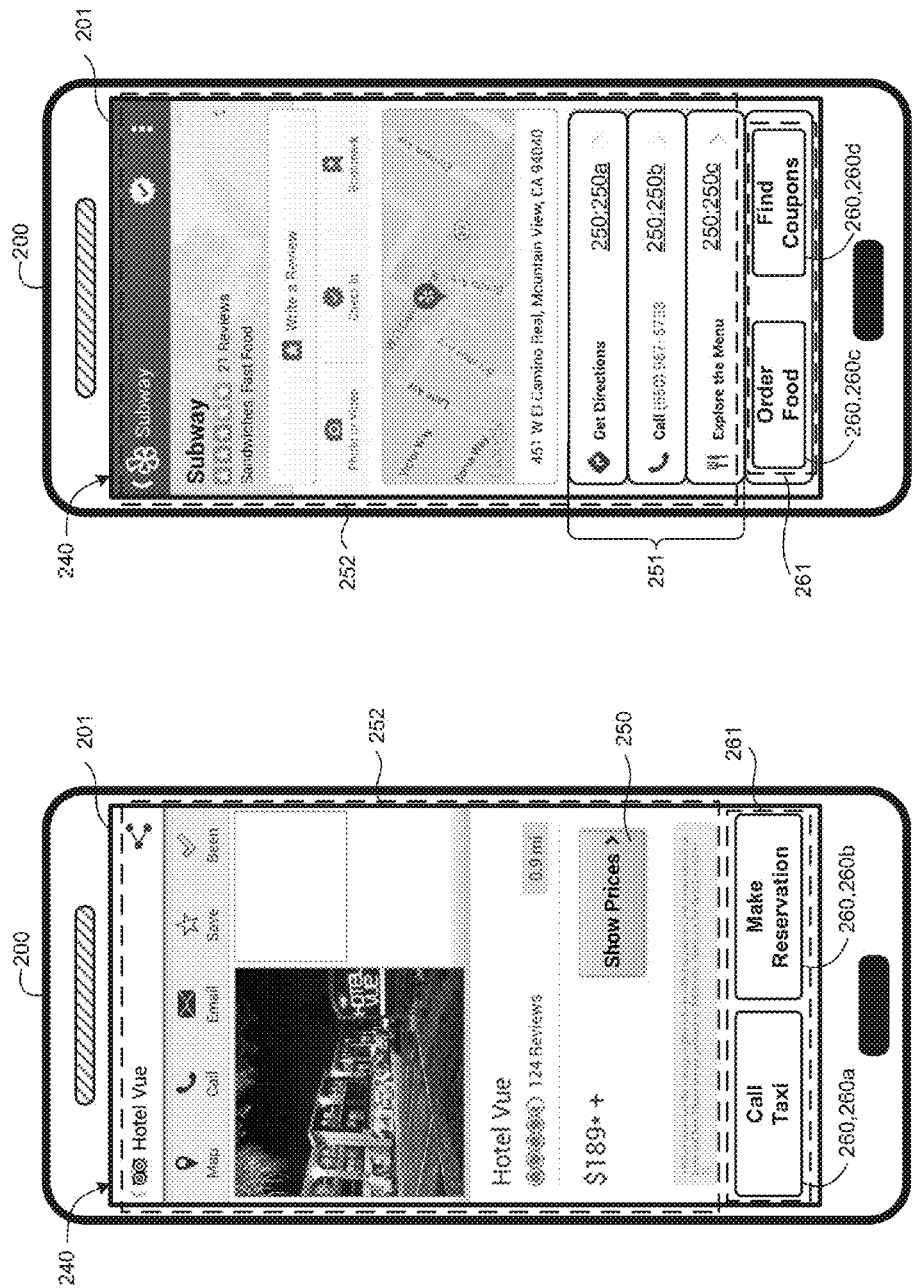
Figure 3D:
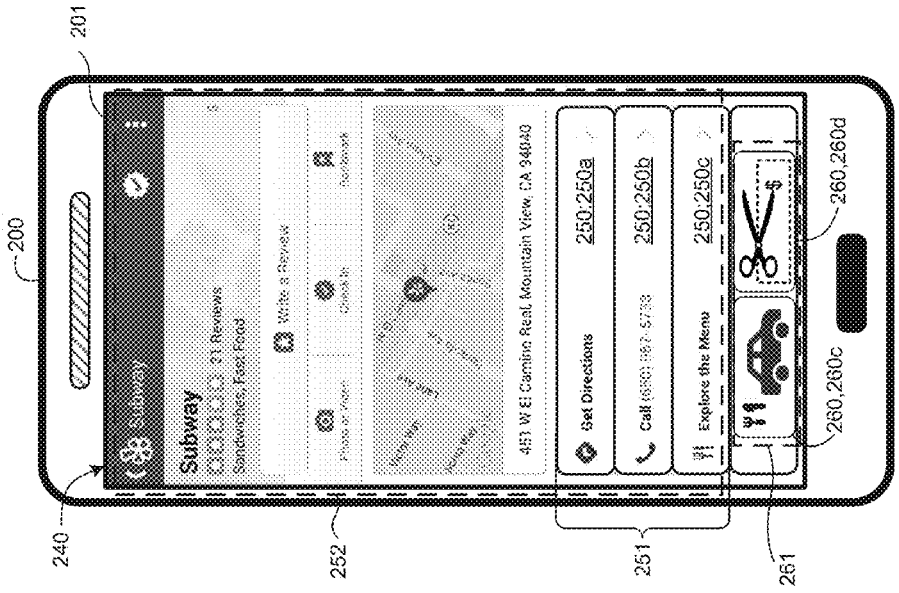
Figure 3C:
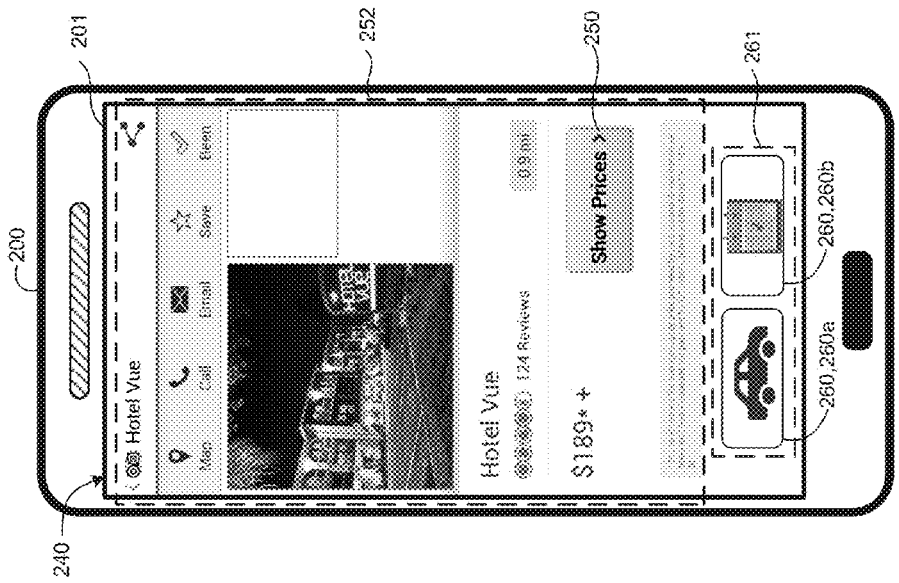

Referring to FIGS. 2-3C, the user device 200 generates and displays state links 260 based on the received link results 220. The user device 200 may additionally display user-selectable links 250. Each state link 260 and link 250 displayed to the user 10 may include an access mechanism 202. A user 10 may select a link 250 or a state link 260 on the user device 200 by interacting with the link 250 or state link 260 (e.g., touching or clicking the link 250, 260). In response to selection of a link 250, 260, the user device 200 may launch a corresponding software application 204 (e.g., a native application 204a or a web-browser application 204b) referenced by the access mechanism 202 and perform one or more operations indicated in the access mechanism 202.

Access mechanisms 202 may include at least one of a native application access mechanism 202a (hereinafter "application access mechanism"), a web access mechanism 202b, and an application download mechanism 202c. The user device 200 may use the access mechanisms 202 to access actions of applications 204. For example, the user 10 may select a state link 260 or link 250 including an access mechanism 202 in order to access actions of an application 204 indicated by the state link 260. The link generation module 310 may transmit one or more application access mechanisms 202a, one or more web access mechanisms 202b, and one or more application download mechanisms 202c to the user device 200 in the link results 220.

An application access mechanism 202a may be a string that includes a reference to a native application 204a and indicates one or more operations for the user device 200 to perform. If a user 10 selects a state link 260 or link 250 including an application access mechanism 202a, the user device 200 may launch the native application 204a referenced in the application access mechanism 202a and perform the one or more operations indicated in the application access mechanism 202a.

An application access mechanism 202*a* includes data that the user device 200 can use to access operations provided by a native application 204*a*. For example, an application access mechanism 202*a* can include data that causes the user device 200 to launch a native application 204*a* and perform an action associated with the native application 204*a*. Performance of operations according to the access mechanism 202 may set the native application 204*a* into a specified state that performs an action. In some examples, an application access mechanism 202*a* for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202*a* for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202*a* may have various different formats and content. The format and content of an application access mechanism 202*a* may depend on the native application 204*a* with which the application access mechanism 202 is associated and the operations that are to be performed by the native application 204*a* in response to selection of the application access mechanism 202*a*. For example, an application access mechanism 202*a* for an internet music player application may differ from an application access mechanism 202*a* for a shopping application. An application access mechanism 202*a* for an internet music player application may include references to musical artists, songs, and albums, for example. The application access mechanism 202*a* for an internet music player application may also reference actions, such as randomizing a list of songs and playing a song or album. An application access mechanism 202*a* for a shopping application may include references to different products that are for sale. The application access mechanism 202*a* for the shopping application may also include references to one or more actions, such as adding products to a shopping cart and proceeding to a checkout.

The link generation system 300 transmits additional data in the link results 220 along with the application access mechanisms 202*a*. For example, the link generation system 300 may transmit data (e.g., link data 262, such as text and/or images), which may be used by the user device 200 to generate state links 260. A state link 260 may include text and/or images that the user 10 may select (e.g., touch) via a user interface 240 displayed on a screen 201 (e.g., a display or touch screen) of the user device 200. Each state link 260 may be associated with an application access mechanism 202*a* such that when the user 10 selects a state link 260, the user device 200 launches the native application 204*a* referenced in the application access mechanism 202*a* and performs the one or more actions indicated in the application access mechanism 202*a*. The text and/or images of a state link 260 displayed to the user 10 may indicate the action that will be performed in response to selection of the state link 260. For example, if the link 260 is to a song in a music playing application, the text and/or images may identify the music application that will be launched by the user device 200 and the song that will be played by the music playing application when the user 10 selects the state link 260.

The user 10 may select a state link 260 or link 250 (hereafter link 250, 260) that causes the user device 200 to launch the native application 204*a* identified by the link 250, 260 and perform one or more actions according to the application access mechanism 202*a* associated with the link 250, 260. Put another way, when the user 10 selects a link 250, 260 the user device 200 launches a native application 204*a* and sets the native application 204*a* into a state defined by the application access mechanism 202*a* associated with the link. In general, a state of a native application 204*a* may refer to the operations and/or the resulting outcome of the native application 204*a* in response to selection of a link 250, 260. A state of a native application 204*a* may also be referred to herein as an "application state."

An application state specified by an application access mechanism 202*a* may depend on the action provided by the native application 204*a*. For example, if a native application 204*a* is configured to retrieve and display information from the Internet, the native application 204*a* can be set into a state in which the native application 204*a* retrieves information from the Internet and displays information to the user 10. In another example, if a native application 204*a* is configured to play media (e.g., music and/or video) from the Internet, the native application 204*a* can be set into a state in which the native application 204*a* is playing a song or a movie from the Internet. In another example, if a native application 204*a* is configured to make restaurant reservations, the native application 204*a* can be set into a state in which the native application 204*a* displays available restaurant reservations to the user 10.

A web access mechanism 202*b* may include a resource identifier that includes a reference to a web resource (e.g., a page of a web application/website). For example, a web access mechanism 202*b* may include a uniform resource locator (URL) (i.e., a web address) used with hypertext transfer protocol (HTTP). If a user 10 selects a link 250, 260 including a web access mechanism 202*b*, the user device 200 may launch the web browser application 204*b* and retrieve the web resource indicated in the resource identifier. Put another way, if a user 10 selects a link 250, 260 including a web access mechanism 202*b*, the user device 200 may launch a corresponding web-browser application 204*b* and access a state (e.g., a page) of a web application/website. In some examples, web access mechanisms 202*b* include URLs for mobile-optimized sites and/or full sites.

The web access mechanism 202*b* included in an entity record 340 and/or application state record 360 may be used by a web browser to access a web resource that includes similar information and/or performs similar actions as would be performed by a native application 204*a* that receives an application access mechanism 202*a* of the entity record 340 and/or application state record 360. For example, the web access mechanism 202*b* of an entity record 340 and/or application state record 360 may direct the web-browser application 204*b* of the user device 200 to a web version of the native application 204*a* referenced in the application access mechanisms 202*a* of the entity record 340 and/or application state record 360. Moreover, if the application access mechanisms 202 included in an entity record 340 and/or application state record 360 for a specific Mexican restaurant cause each application edition to retrieve information for the specific Mexican restaurant, the web access mechanism 202*b* may direct the web-browser application 204*b* of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a link 250, 260 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

An application access mechanism 202a included in an entity record 340 and/or application state record 360 may be an application resource identifier or a string that includes a reference to a native application 204a and/or indicates one or more operations for execution by the native application 204a on the user device 200. An application resource identifier may be a string having an application specific scheme in some examples. For example, the application resource identifier may include a reference to a native application 204a, a domain name, and a path to be used by the native application 204a to retrieve and display information to the user 10. In some examples, an application resource identifier is an application specific resource identifier that is defined by the developer of the application 204. In this example, the link generation application 216 receives the application resource identifier and the operating system 228 may send the application resource identifier to the native application 204a referenced in the application resource identifier. The native application 204a referenced in the application resource identifier launches and is set into the state specified by the application resource identifier.

In some examples, an application access mechanism 202a may not include an application resource identifier. Instead, the application access mechanism 202a includes one or more operations that reference a native application 204a and indicate one or more operations for execution by the user device 200. The one or more operations may include instructions for at least one of the link generation application 216, the operating system 228, and/or a native application 204a on the user device 200. In response to selection of the application access mechanism 202a, the user device 200 may perform the operations included in the application access mechanism 202a. In some examples, the operations may be included in a script. The operations may cause the user device 200 to perform an action via a corresponding native application 204.

In some examples, an application action may not be accessible using an application resource identifier. For example, an action of the application may not include a corresponding application resource identifier that the application 204 may use to perform the action. As another example, some applications 204 may not be configured to receive application resource identifiers. In these examples, an application access mechanism 202 for the native application 204a can include one or more operations that cause the native application to perform the action that may not otherwise be accessible using an application resource identifier. For example, the link generation application 216 may receive the one or more operations and execute the one or more operations to set the native application 204a into the desired application state. In some examples, the one or more operations may include launching the native application 204a along with additional operations for the native application 204a to perform. For example, the link generation application 216 may initially trigger the native application 204a to start and then wait for a period of time, then the link generation application 216 may perform additional operations included in the received application access mechanism 202, such as issuing a search instruction to the native application 204a.

In still other examples, a native application 204a may be configured to directly receive the operations transmitted by the link generation system 300. In these examples, the native application 204a may be launched according to the application access mechanism 202 and then the launched native application 204a may directly perform the operations received from the system 300.

A single native application 204a may provide a variety of different actions. For example, a restaurant reservation application can access reviews for a variety of different restaurants and set up reservations at a variety of different restaurants. Similarly, a travel application can book hotels, book flights, and provide reviews for different travel destinations. The different actions associated with a single native application 204a may be accessed using a plurality of different application access mechanisms 202. For example, with respect to the restaurant reservation application, the application data store 350 may include application state records 360 having different application access mechanisms 202 for booking hotels, booking flights, and accessing reviews for different travel destinations. The entity data store 330 and entity records 340 may also have different application access mechanisms 202 that correspond to the one or more actions that may be indicated in an entity record 340.

The application access mechanisms 202 for a single native application 204a may vary in complexity. In some examples, the application access mechanisms 202 may cause a native application 204a to launch (e.g., the operating system 228 may be instructed to launch the application 204) and then perform additional operations after launching (e.g., proceed to a specific application state), as described above. In other examples, application access mechanisms 202 may cause an application 204 to launch into a default state (e.g., a default homepage) without performing any additional operations (e.g., in the case of an application state that does not perform an action).

The user device 200 may receive a set of link results 220 from the link generation module 310 in response to transmission of the link request 210 to the link generation system 300. The GUI 240 of the link generation application 216 may render and display the link results 220 received from the link generation system 300 as state links 260. The link generation application 216 may display the link results 220 to the user 10 in a variety of different ways, depending on what information is transmitted to the user device 200. In examples where the link results 220 include a list of access mechanisms 202 and link data 262, the link generation application 216 may display the link results 220 to the user 10 as a list 261 of state links 260 including text (FIGS. 3A and 3B) and images (FIGS. 3C and 3D). The text and images in the state links 260 may include application names associated with the access mechanisms 202, text describing the application state associated with the access mechanisms 202, images associated with the application 204 referenced by the access mechanisms 202 (e.g., application icons), and images associated with the application state (e.g., application screen images) defined by the access mechanisms 202.

In some implementations, the link generation application 216 displays the link results 220 as a list of state links 260 arranged adjacent a current application state 252. Moreover, the link generation application 216 may arrange the state links 260 in an order based on relevance scores 226 associated with the access mechanisms 202 included in the links 260.

Each of the state links 260 corresponds to link data 262 included in the link results 220. For example, each of the state links 260 may be generated using link data 262, such as an image (e.g., an icon) and text (e.g., an application or business name) that may describe an application and a state of an application. Each of the state links 260 may correspond to an access mechanism 202 so that if a user 10 selects one of the state links 260, the user device 200 launches the application and sets the application into a state that is specified by the access mechanism 202 associated with the selected state link 260. In some implementations, the user device 200 may arrange the links 260 based on relevance scores associated with the access mechanisms 202 included in the link results 220.

Referring to FIGS. 3A-4C, the client link module 217, via the GUI 240, provides state links 260 with the current displayed application state 252 to indicate that the state links 260 are related to an entity 341 of the current displayed application state 252. For example, a state link 260 may be displayed proximate to the displayed portion of a current application state 252 (e.g., in a GUI 240 element appearing below the contents of the current application state 252). A state link 260 may be displayed in other places in relation to a current application state 252. For example, the state link 260 may appear in a GUI element on either side, above, or even within a current application state 252.

As shown in FIGS. 3A-3B and 4A-4C, state links 260 may be displayed as text. Additionally or alternatively, as depicted by FIGS. 3C and 3D, the state links 260 may also be displayed as icons (e.g., when the link generation system 300 includes an application state data store 350 to retrieve additional information, thereby allowing the display of icons, graphics, or additional information relating to the application states associated with the state links 260). Other methods of displaying the links are possible as well.

Referring to FIGS. 3A-3D, in some examples, the client link module 217 is included in a native application 204a of the user device 200. For example, the client link module 217 may be implemented using a Software Development Kit (SDK), which may be a set of software development tools allowing a programmer the ability to create and modify applications for a certain software package, software framework, hardware platform, computer system, video game console, operating system, or any other development platform. Referring back to FIGS. 3A-3D, the client link module 217 transmits the link request 210 in response to the native application entering the current displayed application state 252 (e.g., in response to an automatic event). The client link module 217 may then render one or more state links 260 upon receipt of the link data 262 from the link generation system 300. Although the client link module 217 may transmit a link request 210 in response to the opening of the current displayed application state 252, in other implementations, the client link module 217 may transmit the link request 210 in response to other events (e.g., a manual event). In one example, the current displayed application state 252 may include a user interface element (e.g., a button) with which the user 10 may interact in order to transmit the link request 210. For example, the button (not shown) may include the text "request additional actions". In additional examples, an event may include a user scrolling down the screen. For example, the client link module 217 may transmit the link request 210 upon detecting that the user 10 has scrolled down the screen past a specific point or to the end of the page.

As shown in FIGS. 3A and 3C, the current application state 252 is a state of a travel application, TRIPADVISOR® (developed by TripAdvisor, Inc.) displaying a hotel name and a price estimate. In addition, the current application state 252 includes a user-selectable link 250 that indicates the action "show prices," which, upon selection by a user, may cause the user device 200 to provide a detailed listing of prices for available rooms. The client link module 217 additionally displays two state links 260a, 260b ("call taxi" 260a and "make reservation" 260b) provide different actions than the action provided by the current application 252 (e.g., "show prices"). The state links 260a, 260b are shown as buttons at the bottom of the GUI 240. The state links 260 may be displayed in other areas of the GUI 240, such as the top or sides, or both. In another example, and as shown in FIGS. 3B and 3D, the current application state 252 shows a state of a business review application, YELP® (developed by Yelp, Inc.), that provides several actions accessible upon selection of a link 250, such as a "get directions" link 250a, a "call location" link 250b, and an "explore the menu" 250c link. In this example, the client link module 217 receives link results 220 that may be used to generate state links 260 to application states with different actions than the actions provided by the current application state 252. For example, the state links 260 do not contain a "get direction" link, a "call location" link, or an "explore the menu" link. Instead, the state links 260 generated from the received link results 220 may provide the actions "order food" (e.g., via the state link 260c) and "find coupons" (e.g., via the state link 260d).

Referring to FIGS. 4A-4C, in some implementations, the client link module 217 is included on the user device 200 separately and not as a part of a native application. For example, though depicted in FIG. 4A as being separate components, the client link module 217 may be implemented by an operating system executing a launcher. In another example, the client link module 217 may be implemented by a third-party application executing a launcher. In each example, the client link module 217 executes separately from the native applications 204 being enhanced with state links 260. For example, the client link module 217 may run as a background process that may detect a current application state 252 and may also detect when an automatic or manual event occurs. For example, the client link module 217 may transmit link requests 210 upon detecting an automatic event, such as a user 10 entering a current displayed application state 252. In some examples, the client link module 217 may transmit link requests 210 upon detection of a manual event occurring within a current application state 252, such as a user 10 selecting a rendered UI element (e.g., swiping the launcher UI element). The client link module 217 (e.g., via a launcher) renders the state links 260 outside of the current application in a dedicated location 263 (e.g., in an overlay component of the GUI 240).

Referring to FIG. 4A, the current displayed application state 252 shows a state of the TRIPADVISOR® application (developed by TripAdvisor, Inc.) displaying a hotel name and a price per night. In addition, the current application state 252 displays a link 250 that, upon user selection, may perform the action "show prices" (e.g., cause the user device to provide a detailed listing of prices for available rooms). The client link module 217 additionally displays two state links 260a, 260b, each performing a different action than the action of the current application state 252 (e.g., "call taxi" and "make reservation") in a dedicated location 263. The state links 260a, 260b are displayed (e.g., overlayed over the GUI of the current application state 252) as buttons in the dedicated location 263. The dedicated location 263 may be displayed in other areas of the GUI 240, such as the top or side of the GUI 240.

Referring to FIGS. 4B and 4C, the current application state 252 shows a state of the YELP® application (developed by Yelp, Inc.) that provides the actions "get directions", "call", and "explore the menu" (e.g., via the links 250a, 250b, 250c respectively). In this example, client module 217 executes separately from the current application 252 and receives link results 220 including link data 262 used to provide state links 260 that do not perform the same actions as the current application state 252. For example, the state links 260 do not provide the actions "get directions", "call location", or "explore the menu". In order to enhance a user's experience, the state links 260c, 260d may cause the user device 200 to perform the actions "order food" and "find coupons". FIGS. 4B and 4C illustrate a manual event wherein a user 10 interacts with a launcher overlay. More specifically, the user 10 expands a location button 265 to display a list 261 of state links 260 as shown in FIG. 4C. The user 10 may either swipe the location button 265 upwards in order to view the state links 260 or press the location button 265. To minimize the list 261, the user 10 may swipe the location button towards the bottom of the display 201 or press the location button 265 when in the expanded form.

Referring back to FIG. 1B, the data sources 130 may be sources of data that the link generation system 300 may use to generate and update the entity data store 330 and/or the application state data store 350. The data retrieved from the data sources 130 can include any type of data related to application actions and/or application states. Data retrieved from the data sources 130 may be used to create and/or update one or more databases, indices, tables (e.g., an access table), files, or other data structures included in the entity data store 330 and/or application state data store 350. For example, application state records 360 and entity records 340 may be created and updated based on data retrieved from the data sources 130. In some examples, some data included in a data source 130 may be manually generated by a human operator. Data included in the application state records 360 and entity records 340 may be updated over time so that the link generation system 300 provides up-to-date results.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

Figures 5A, 5B:
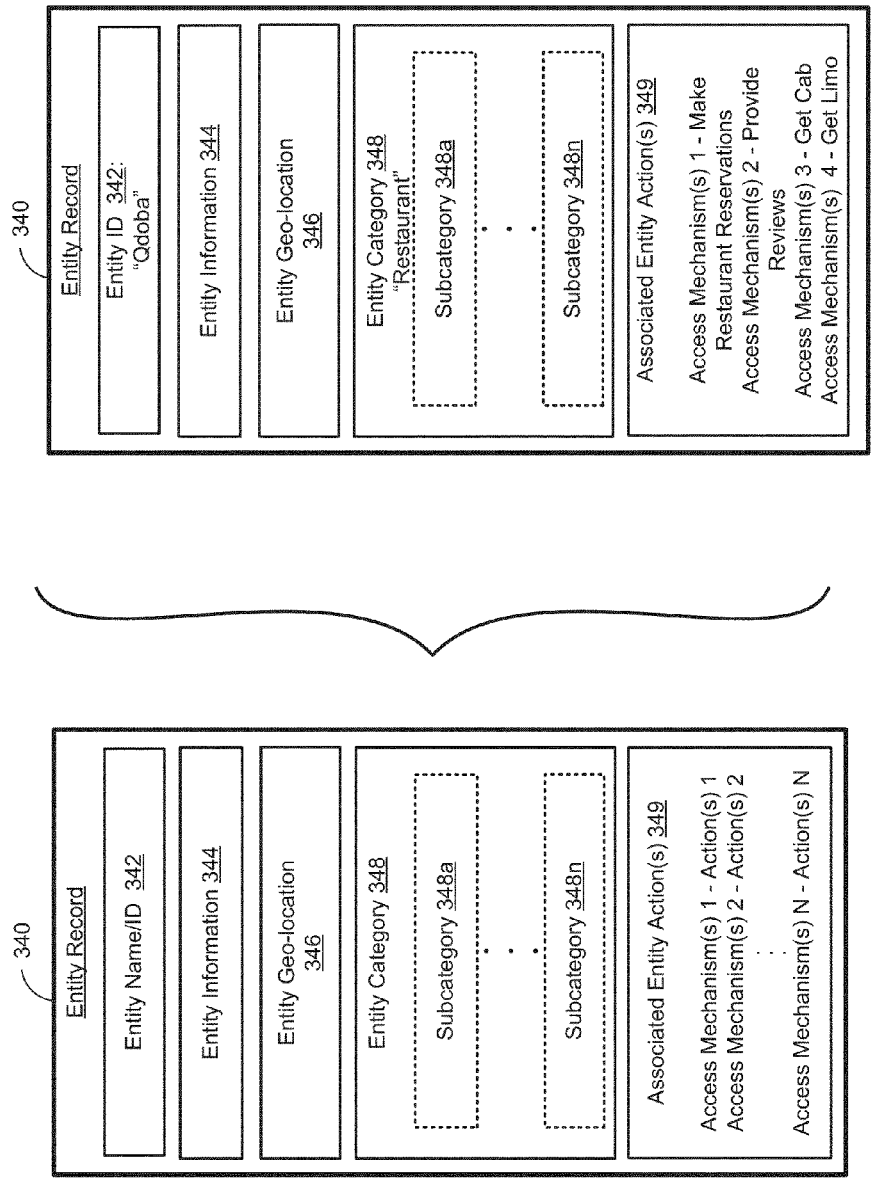
FIGS. 5A and 5B are schematic views of an example entity record.

Referring to FIGS. 5A and 5B, the entity data store 330 includes a plurality of different entity records 340. Each entity record 340 may include data related to an entity 341. The entity 341 can be any person, place, or thing (e.g., restaurants, bars, gas stations, supermarkets, celebrities, products, movie theaters, doctor offices, parks, and libraries, etc.). An entity record 340 may include an entity identifier or name (ID) 342, entity location data 346 (e.g., geolocation data), an entity category 348 (and optionally one or more sub-categories 348a-348n), entity information 344, and associated entity actions 349.

The entity ID 342 may be used to identify the entity record 340 among the other entity records 340 included in the entity data store 330. The entity ID 342 may be a string of alphabetic, numeric, and/or symbolic characters (e.g., punctuation marks) that uniquely identifies the associated entity record 340. In some examples, the entity ID 342 describes the entity 341 in human readable form. For example, the entity ID 342 may include the name string of the entity 341 or a human readable identifying the entity 341. In some examples, the entity ID 342 includes a string in the format of a uniform resource locator (URL).

In a more specific example, if the entity record 340 describes a restaurant named Qdoba® (QDOBA is a registered trademark of the Qdoba Restaurant Corporation), the entity ID 342 for the entity record 340 can be "Qdoba." In an example where the entity ID 342 includes a string in human readable form and/or a URL, the entity ID 342 may include the following string "Qdoba, 42967 Woodward Avenue, Bloomfield Township, Mich. 48304" to uniquely identify the entity record 340. Other unique identifiers are possible as well, such as unique identifiers based on a store number.

The entity information 344 may include any information about the entity 341, such as text (e.g., description, reviews) and numbers (e.g., number of reviews). This information may even be redundant to other information contained in the entity record 340, but optionally structured for display on a user device 200, for example. The entity information 344 may include a variety of different types of data, such as structured, semi-structured, and/or unstructured data. Moreover, the entity information 344 may be automatically and/or manually generated based on documents retrieved from the data sources 130.

The entity location data 346 may include data that describes a location of the entity 341. This data may include a geolocation (e.g., latitude and longitude coordinates), a street address, or any information that can be used to identify the location of the entity 341 within a geographical area. In some implementations, the entity location data 346 may define a geo-location associated with the application state record 360.

The entity category 348 provides a classification or grouping of the entity 341. Moreover, the entity category can have one or more sub-categories to further classify the entity 341. For example, the entity record 340 could have an entity category 348 of "restaurant" and a sub-category 348a a type of cuisine, such as "French cuisine" or "contemporary." Any number of sub-categories 348a-348n may be assigned to classify the entity 341 for use during a search.

The associated entity action(s) 349 provide one or more access mechanism 202 associated with the entity ID 342. Each access mechanism 202 of the associated entity action 349 corresponds to an action associated with a different application. For example, the entity record 340 could be an entity 341 of a restaurant as shown in FIG. 5B. In a more specific example, the associated entity actions (s) 349 of an entity record for the entity "Qdoba" may include an access mechanism 202 for the reservation application OPENTABLE® (developed by OpenTable, Inc.) and indicate an action corresponding to the access mechanism such as "Make Restaurant Reservation". Another associated entity action(s) 349 for the entity "Qdoba" may correspond to the business review application YELP® (developed by Yelp, Inc.) and be associated with the action "Provide Reviews". Other examples are possible as well. In this way, an entity record 340 includes multiple actions associated with the entity 341 ("Qdoba") and each action can be associated with an access mechanism.

Figure 5D:
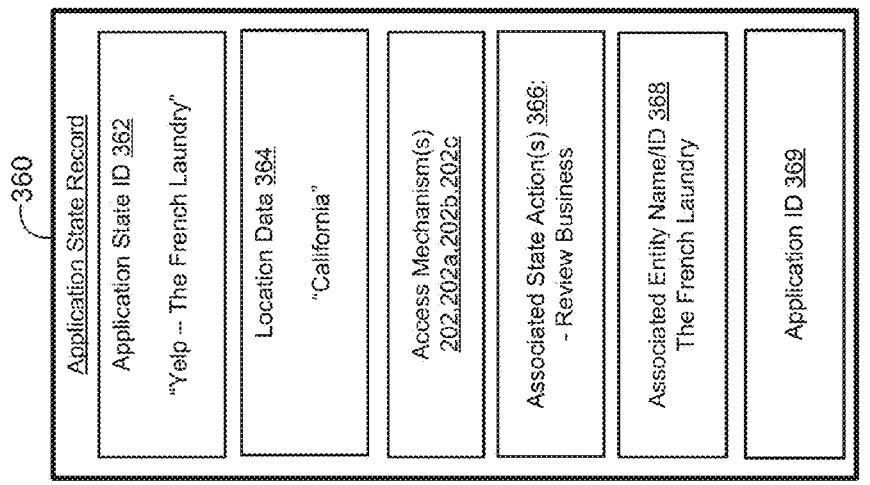
FIGS. 5C and 5D are schematic views of an example application state record.
Figure 5C:
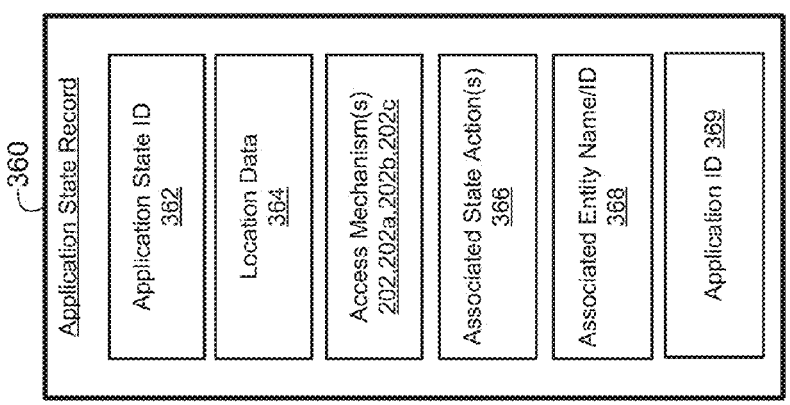

Referring to FIGS. 5C and 5D, the application data store 350 includes a plurality of different application state records 360. Each application state record 360 may include data related to an action of an application 204 and/or the state of the application 204 resulting from performance of the action. An application state record 360 may include an application state identifier (ID) 362, location information 364, one or more access mechanisms 202, 202a, 202b, 202c used to access the actions provided by an application 204, associated state actions (s) 349, associated entity IDs 368, and an application ID 369 identifying the application 204 to which the application record 360 corresponds. The link generation module 310 may populate the application state records 360 using data acquired from the data sources 130.

The application state ID 362 may be used to identify the application state record 360 among the other application state records 360 included in the application data store 350. The application state ID 362 may be a string of alphabetic, numeric, and/or symbolic characters (e.g., punctuation marks) that uniquely identifies the associated application state record 360. In some examples, the application state ID 362 describes an action and/or an application state in human readable form. For example, the application state ID 362 may include the name of the application 204 referenced in the access mechanism(s) 202. In a specific example, an application state ID 362 for an internet music player application may include the name of the internet music player application along with the song name that will be played when the internet music player application is set into the state defined by the application access mechanism included in the application state record 360. Additionally or alternatively, the application state ID 362 may be a human readable string that describes an action performed according to the access mechanism(s) 202 and/or an application state resulting from performance of the action according to the access mechanism(s) 202. In some examples, the application state ID 362 includes a string in the format of a uniform resource locator (URL) of a web access mechanism 202b for the application state record 360, which may uniquely identify the application state record 360.

In a more specific example, if the application state record 360 describes an action of the native application 204a YELP®, the application state ID 362 may include the name "Yelp" along with a location associated with the application state described in the location information 364. For example, the application state ID 362 for an application state record 360 that describes the restaurant named "The French Laundry" may be "Yelp—The French Laundry." In an example where the application state ID 362 includes a string in the format of a URL, the application state ID 362 may include the following string "http://www.yelp.com/biz/the-french-laundry-yountville-2?ob=1" to uniquely identify the application state record 360. In additional examples, the application state ID 362 may include a URL using a namespace other than "http://," such as "func://." For example, the application state ID 362 may include the following string "func://www.yelp.com/biz/the-french-laundry-yountville-2?ob=1."

The associated state action(s) 366 identifies an action of each one of the application access mechanism(s) of the application state record 360. For example, if the application state record 360 is for an application that provides restaurant reviews, then the associated state action 366 may be "Review Business." As another example, if the application state record 360 is for an application that provides directions to a location, then the associated state action 366 may be "Navigate To." For example, the associated state actions(s) 349 of FIG. 5D for the application state record 360 of the YELP® application may be 'make reservations,' 'find taxi,' and 'navigate to.'

The associated entity name or identifier (ID) 368 identifies an entity 341 associated with the application access mechanism(s) 202. For example, if the application state record 360 is for an application that provides restaurant reviews, then the associated entity ID 368 may include a name of a restaurant. As another example, if the application state record 360 is for an application that provides directions to a location, then the entity indicated by the associated entity ID 368 may be a location to which the application can navigate. As an example, an associated entity ID for the application state record 360 illustrated by FIG. 5D may be "The French Laundry", which is the name of a restaurant (i.e., an entity 341). In some examples, the application state record 360 includes an application identifier (ID) 369 identifying an application associated with the application state record.

In some implementations, an application state record 360 includes multiple different application access mechanisms 202, 202a, 202b, 202c that may include a variety of information. The application access mechanism 202 may include edition information that indicates the application edition with which the application access mechanism 202 is compatible. For example, the edition information may indicate the operating system 228 with which the application access mechanism 202 is compatible. Moreover, different application access mechanisms 202 may be associated with different editions of a native application 204a. A native application edition (hereinafter "application edition") refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 228.

The different application access mechanisms 202 included in an application state record 360 may cause the corresponding application editions to launch and perform similar actions. Accordingly, the different application access mechanisms 202 included in an application state record 360 may cause the corresponding application editions to be set into similar application states. For example, if the application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, an application state record 360 for a native application 204*a* that retrieves restaurant information may include multiple different application access mechanisms 202 for multiple different application editions. Assuming the application state record 360 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the link generation system 300 can determine whether to transmit the application access mechanism 202 in the link results 220 based on whether the user device 200 can handle the application access mechanism 202.

Figure 6A:
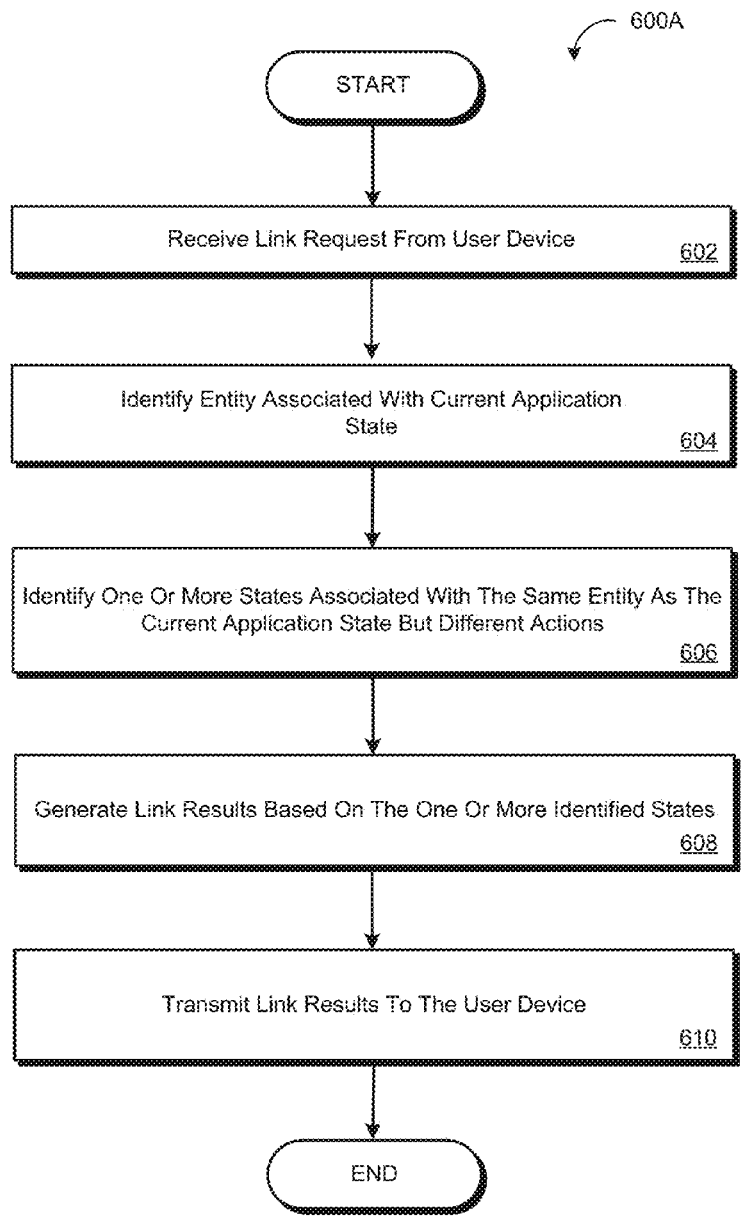
FIGS. 6A and 6B are schematic views illustrating example methods of generating state links.

FIG. 6A provides an example arrangement of operations for a method 600A of identifying one or more state links 260 using the link generation system 300 of FIG. 2. At block 602, the link generation module 310 receives a link request 210 from a user device 200. The link request 210 includes current application state data 212 corresponding to a current displayed application state 252. At block 604, the link generation module 310 identifies an entity 341 indicated by the current application state data 212. At block 606, the link generation module 310 may retrieve an entity record 340 associated with the identified entity 341. The link generation module 310 may utilize the entity record 340 (e.g., associated entity actions 349) to identify application states with the same entity but different actions than the application state indicated in the link request 210. The link generation module 310 may additionally or alternatively access the application state data store 350 based on the information in the link request 210 and/or entity record 340 to retrieve application state records 360 of application states associated with the same entity but different actions than those indicated in the link request 210. At block 608, the link generation module 310 generates link results 220 based on the one or more access mechanisms 202 indicated by the retrieved entity record 340 and/or application state record(s) 360. The link generation module 310 may include additional data from the retrieved application state records 360 and/or entity record 340 such as link data 262 and/or relevance scores 226 corresponding to the access mechanism 202. The link generation module 310 may select one or more of the application states (i.e., access mechanisms 202) indicated by the retrieved records to be used to generate the link results 220 (i.e., the link generation module 310 may select which application states the link results 220 will correspond to). For example, the link generation module 310 may filter application states based on information contained in the link request 210 (e.g., a request for state links corresponding to a specific application). In another example, the link generation module 310 may filter application states based on availability (e.g., the link generation module 310 identifies several state links but the link request 210 requests one state link). In some examples, the link generation module 310 selects application states based on a predesignated selection by a system operator of the link generation system 310 or application developer of the current application 252. At block 610, the link generation module 310 transmits the link results 220 including the selected one or more identified application states to the client link module 217, where a user device 200 may display the received link results 220 as user-selectable state links 260.

Figure 6B:
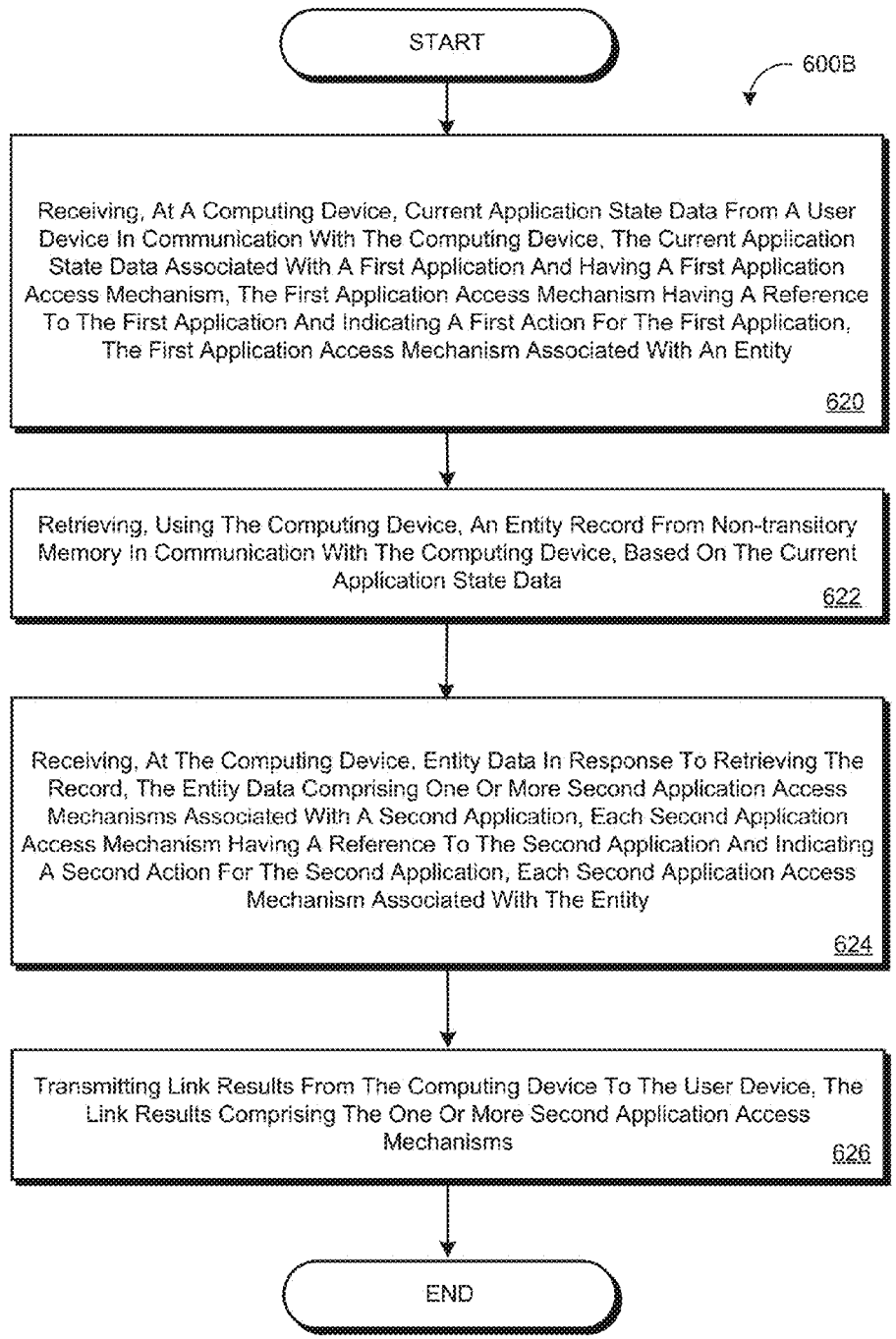

FIG. 6B provides a more detailed example arrangement of operations for a method 600B of transmitting a link request 210 and receiving link results 220 based on the link request 210, then displaying state links 260 based on the link results 220. At block 620, the method 600B includes receiving, at a computing device 112, 800, current application state data 212 from a user device 200 in communication with the computing device 112, 800. The current application state data 212 is associated with a first application (executing on the user device 200 and displayed as a current displayed application state 252) and has a first application access mechanism 202. The first application access mechanism 202 has a reference to the first application and indicates a first action for the first application. The first application access mechanism is associated with an entity 341. At block 622, the method 600B includes retrieving, using the computing device 112, 800, an entity record and application state records from non-transitory memory (e.g., entity data store 330 and application state data store 350) in communication with the computing device 112, 800, based on the current application state data 212.

At block 624, the method 600B further includes receiving, at the computing device 112, 800, entity data (e.g., an entity record 340) in response to retrieving the records. The entity data (e.g., an entity record 340) includes one or more second application access mechanisms associated with a second application. Each second application access mechanism has a reference to the second application and indicates a second action for the second application. Each second application access mechanism is associated with an entity 341. At block 626, the method further includes transmitting link results 220 from the computing device 112, 800 to the user device 200. The link results 220 include the one or more second application access mechanisms. Each of the second actions for the second application may be different than the first action associated with the first application. The method 600B may further include, in addition to receiving the entity data (e.g., an entity record 340), receiving, at the computing device 112, 800, application state data (e.g., application state records 360) corresponding to the one or more second application access mechanisms. The application state data (e.g., application state records 360) may include application state actions identifying an action of the corresponding second application access mechanism 202 (e.g., associated state action 366), an entity ID 342 identifying an entity 341 associated with the corresponding second application access mechanism, and application state information describing a state of the corresponding second application when the corresponding second application performs the action indicated in the corresponding second application access mechanism.

In some implementations, the method 600B includes scoring the one or more second application access mechanisms based on a relevance score 226 indicating the relevance of the second application access mechanism to the current application state data 212 and ordering the one or more second application access mechanisms based on their scores 226. At least one application access mechanism 202 may include an application resource identifier 369 referencing a native application. The application resource identifier(s) may be in an application-specific format specific for a referenced native application and indicate one or more performable operations for a user device 200 to perform. Additionally or alternatively, the application resource identifier 369 may include a domain name and a path to be used by a referenced native application to retrieve and display information.

At least one application access mechanism may include instructions for at least one of a search application, an operating system, or a referenced native application when executed on the user device. At least one application access mechanism may further include a web address that, when executed by the user device 200, causes the user device 200 to execute a web browser and access a web version of a native application referenced in an application access mechanism.

Figure 7A:
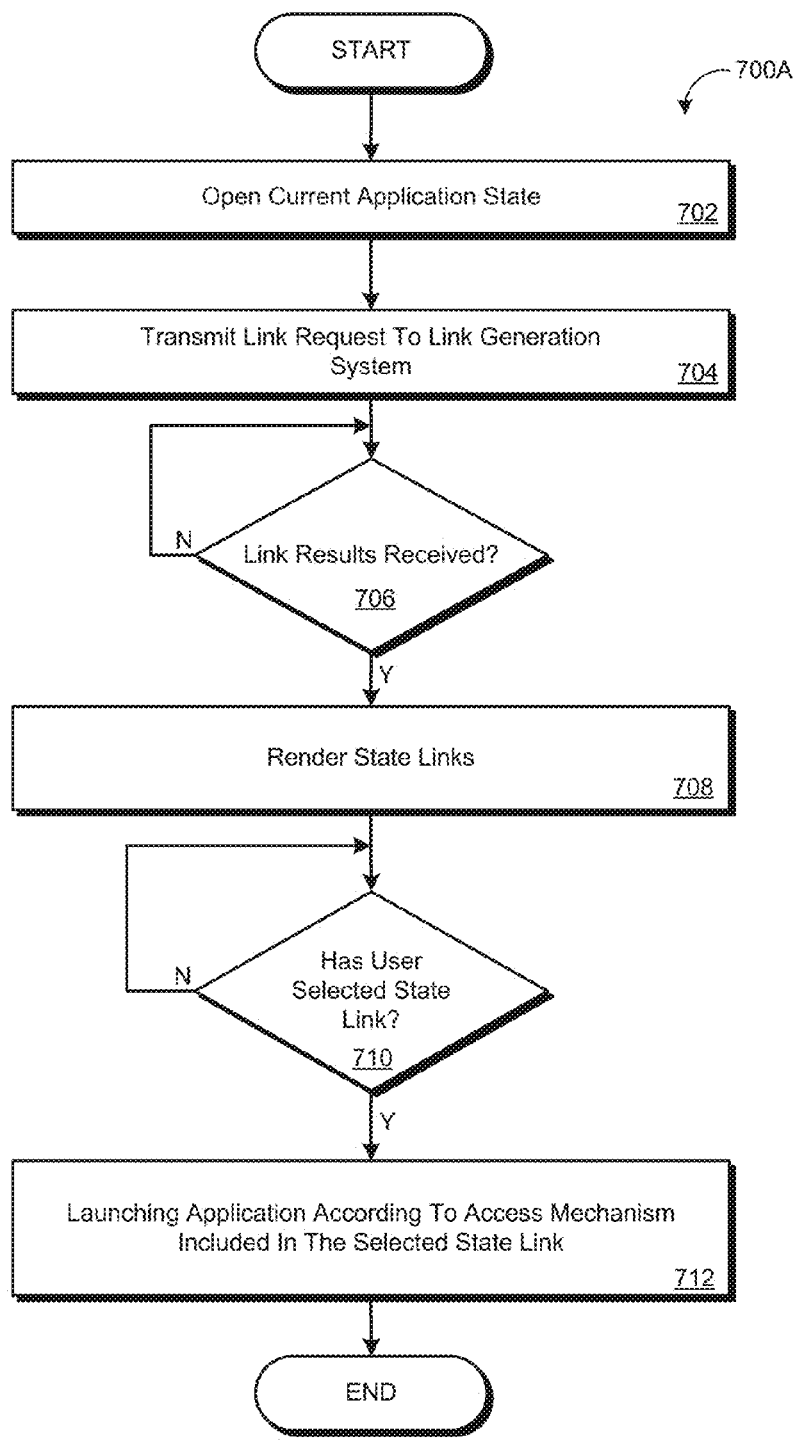
FIGS. 7A and 7B are schematic views illustrating an example method of transmitting a link request and receiving link results.

FIG. 7A provides an example arrangement of operations for a method 700A of transmitting a link request 210 to a link generation system 300 and receiving link results 220 that a user device 200 may use to display user-selectable state links 260. At block 702, the method 700A includes opening, at a user device 200, a current application state 252. At block 704, the method 700A includes transmitting a link request 210 to a link generation system 300 from the user device 200, the user device 200 in communication with the link generation module 310 via a network 120. At decision block 706, the method 700A determines if the user device 200 (e.g., client link module 217) received link results 220 from the link generation module 310. When the method 700A determines that the user device 200 received the link results 220, it proceeds to block 708. At block 708, the method 700A (via the client link module 217) renders and displays the received link results 220 as state links 260. At decision block 710, the method 700A determines when the user 10 selects a state link 260, and once the user 10 selects a state link 260, the method 700A launches an application according to an access mechanism 202 associated with the state link 260.

Figure 7B:
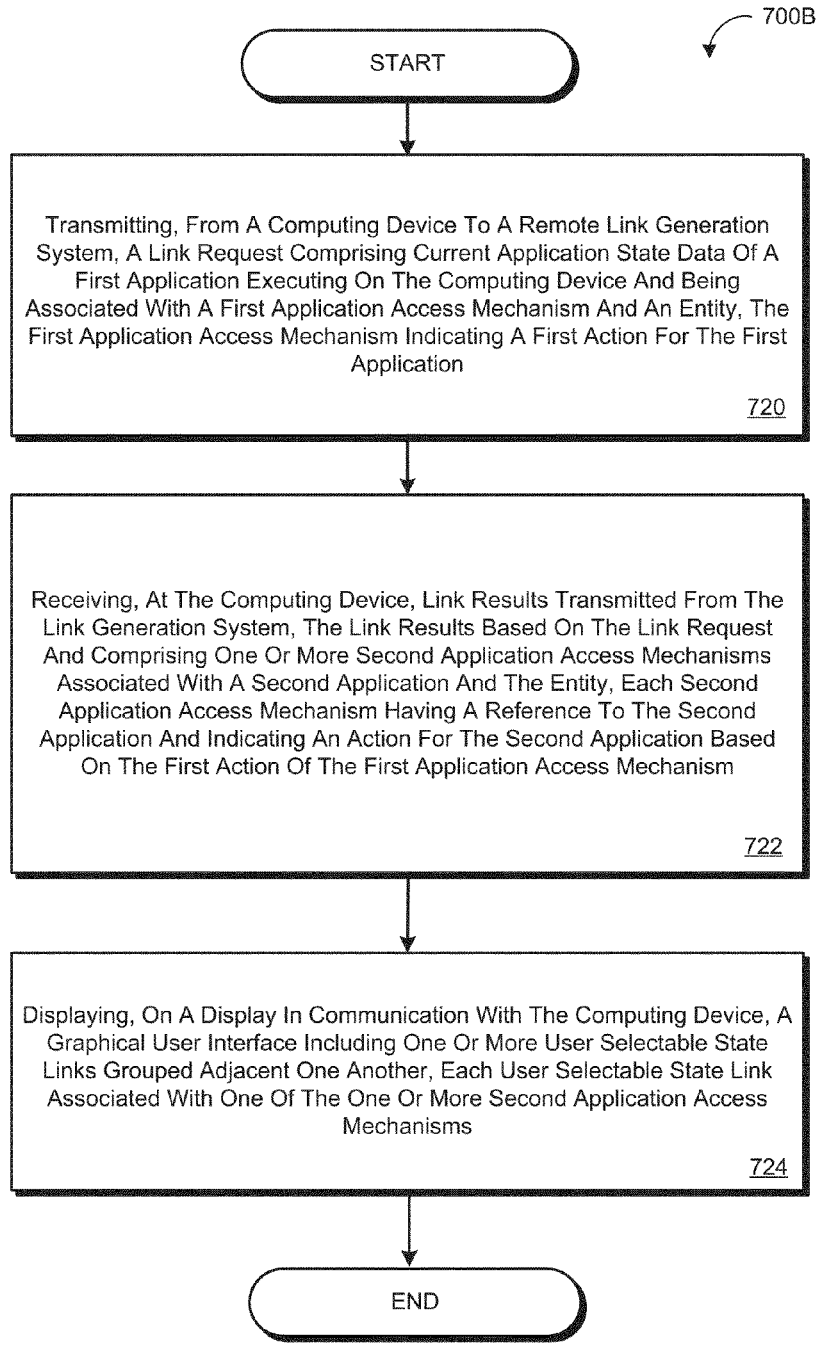

FIG. 7B provides an example arrangement of operations for a method 700B of transmitting a link request 210 and receiving link results 220 that a user device 200 may use to display state links 260. At block 720, the method 700B includes transmitting, from a computing device (e.g., a user device 200) to a remote link generation system 300, a link request 210 including current application state data 212 of a first application executing on the computing device 200 and being associated with a first application access mechanism 202 and an entity 341. The first application access mechanism 202 indicates a first action for the first application. At block 722, the method 700B also includes receiving, at the computing device 200, link results 220 transmitted from the link generation system 300. The link results 220 are based on the link request 210 and include one or more second application access mechanisms 202 associated with a second application and the entity 341. Each second application access mechanism 202 has a reference to the second application and indicates a second action for the second application based on the first action of the first application access mechanism 202. At block 724, the method 700B further includes displaying, on a display 201 in communication with the computing device 200, a graphical user interface 240 including one or more state links 260 grouped adjacent to one another. Each state link 260 is associated with one of the one or more second application access mechanisms 202.

The method 700B may include displaying a threshold or maximum number of state links 260 associated with one or more of the second application access mechanisms 202. The method 700B may further include receiving, at the computing device 200, a user selection of a state link 260. The method may also include executing, at the computing device 200, the second application access mechanism 202 associated with the selected state link 260 and displaying, in the graphical user interface 240, data associated with the second application access mechanism 202.

In some examples, the method 700B includes displaying, in the graphical user interface 240, an expansion button 265 (see FIGS. 4B and 4C) configured to show or hide the state links 260 associated with one or more of the second application access mechanisms 202. Additionally or alternatively, the method 700B may include receiving a user selection of the expansion button 265 (e.g., in order to show or hide the state links 260).

Though the link results 220 are described above as being generated based on application state records 360 retrieved from the application state data store 350, the application state records 360 may be dynamically generated. In these examples, the link generation module 310 may utilize an action ontology stored in the application state data store 350. In some implementations, the action ontology, instead of being stored in the application state data store 350, may be hardcoded or preprogrammed into the link generation system 300.

The link generation module 310 may utilize the action ontology to generate application state records 360 associated with the same entity as the entity of the link request, but that perform different actions than the action of the link request. The link generation module 310 may select actions from the ontology and utilize information provided by the data sources 130 corresponding to the selected actions to generate dynamic application state records 360. In this way, the link generation module 310 may provide link results 220 without the use of application state records 360 stored in a data store.

Modules and data stores included in the link generation system 300 represent features that may be included in the system 300 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the system 300 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the system 300 may be configured to communicate with the network 120. The one or more computing devices of the system 300 may also be configured to communicate with one another (e.g., via a computer network). In some examples, the one or more computing devices of the system 300 may include one or more server computing devices configured to communicate with user devices (e.g., receive query wrappers and transmit results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the systems 300 may be distributed across a number of geographic locations.

Figure 8:
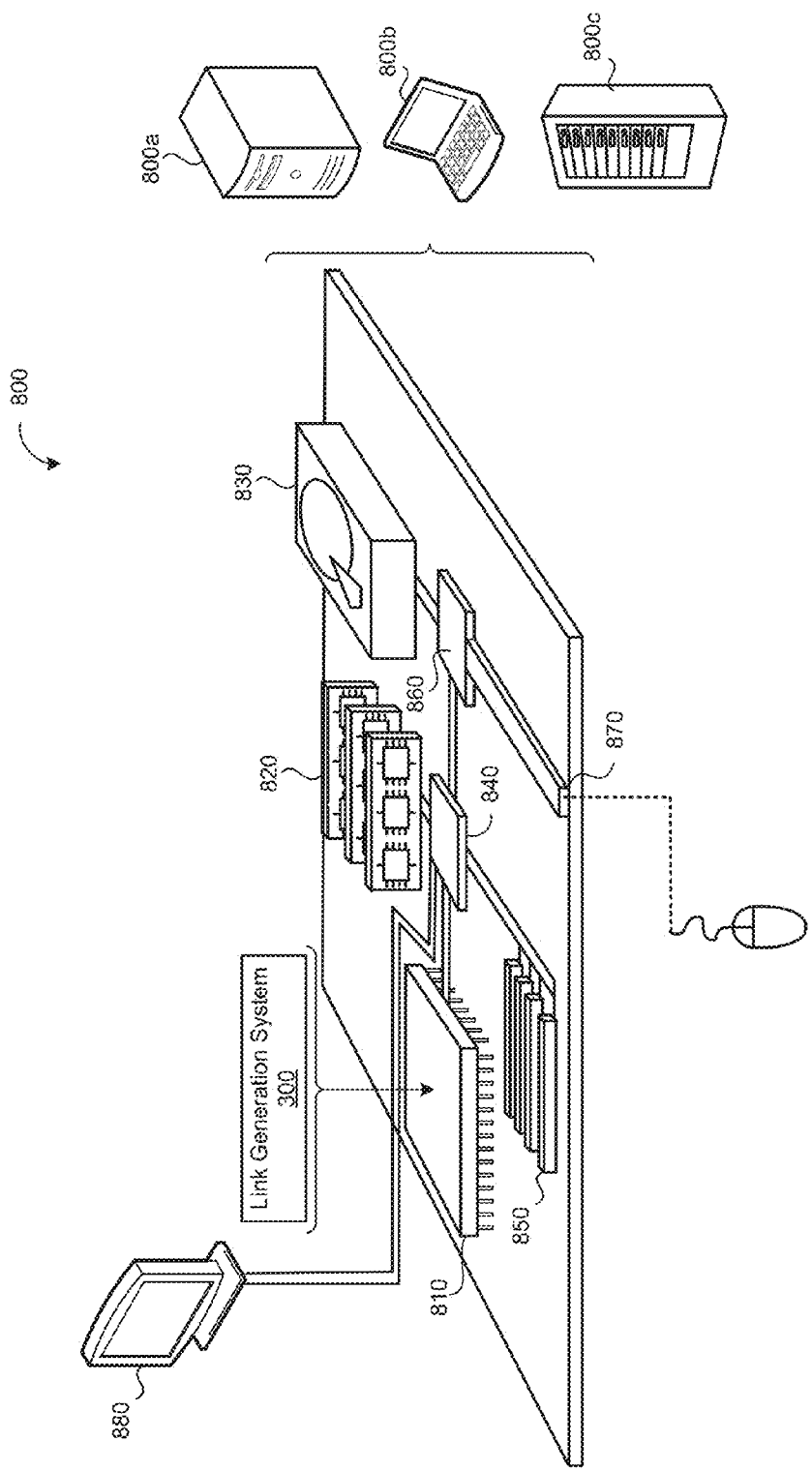
FIG. 8 is a schematic view of an example computing device executing any systems or methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although operations may be depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   in response to a remote device displaying a first application state of an application being executed by the remote device, receiving, by a processing system including one or more processors, a link request from the remote device, wherein:
      the link request indicates an entity name associated with the first application state and an action associated with first application state; and
      the action is a task to be performed by the application being executed by the remote device;
   identifying, by the processing system, a plurality of application state records from a data store based on a match between the entity name of the link request and an entity name indicated by each application state record of the plurality of application state records, wherein each application state record indicates a different action than the link request;
   for each application state record of a set of the plurality of application state records, generating, by the processing system, a relevance score based on a match between text of the link request and text of the application state record;
   selecting, by the processing system, a first application state record from the set of the plurality of application state records based on the relevance scores of the set of the plurality of application state records;
   generating, by the processing system, a link result based on the first application state record, wherein the link result is configured to be displayed as a user-selectable link by the remote device; and
   transmitting, by the processing system, the link result to the remote device.

2. The method of claim 1, wherein the link request includes at least one of a number of requested links, an application state identifier, and an access mechanism.

3. The method of claim 2, wherein:
   the link request is transmitted by the remote device manually, and
   a user intentionally causes the remote device to transmit the link request.

4. The method of claim 2, wherein the link request is transmitted by the remote device automatically in response to user interaction with an element of a graphical user interface displayed by the remote device.

5. The method of claim 1, wherein the first application state record comprises:
   application state information describing an application state associated with the first application state record, and
   an access mechanism that causes the remote device to (i) launch an application associated with the first application state record, and (ii) display the application state associated with the first application state record.

6. The method of claim 5, wherein the first application state record corresponds to a different application than an application indicated by the link request.

7. The method of claim 5, wherein:
   the first application state record includes a dynamic access mechanism configured to receive additional parameters associated with the link request, and
   the method further comprises generating a completed access mechanism based on the dynamic access mechanism and the additional parameters.

8. The method of claim 1, further comprising
   identifying, by the processing system, a first entity record of a plurality of entity records from an entity data store based on a match between the entity name of the link request and the entity name indicated by each of the plurality of entity records, wherein:
      the first entity record indicates a plurality of actions that are different than the action of the link request; and
      each of the plurality of actions corresponds with one or more related application state records; and
   identifying, by the processing system, the plurality of application state records based on each of the one or more related application state records.

9. The method of claim 8, wherein the first entity record comprises:
   an entity name that uniquely identifies an entity and matches the entity name of the link request,
   entity information describing the entity,
   an entity category,
   a list of actions associated with the entity, and
   a list of application state records related to the entity.

10. The method of claim 1, wherein the link result includes an access mechanism of the first application state record.

11. A system comprising:
    a data store comprising one or more storage devices;
    one or more computing devices including one or more processing units that execute computer-readable instructions, the computer-readable instructions, when executed by the one or more processing units, cause the one or more computing devices to:

receive a link request from a remote device in response to the remote device displaying a first application state of an application being executed by the remote device, wherein:
    the link request indicates an entity name associated with the first application state and an action associated with the first application state; and
    the action is a task to be performed by the application being executed by the remote device;
identify a plurality of application state records from the data store based on a match between the entity name of the link request and an entity name indicated by each application state record of the plurality of application state records, wherein each application state record of the plurality of application state records indicates a different action than the link request;
for each application state record of a set of the plurality of application state records, generate a relevance score based on a match between text of the link request and text of the application state record;
select a first application state record from the set of the plurality of application state records based on the relevance scores of the set of the plurality of application state records;
generate a link result based on the first application state record, wherein the link result is configured to be displayed as a user-selectable link by the remote device; and
transmit the link result to the remote device.

12. The system of claim 11, wherein the link request includes at least one of a number of requested links, an application state identifier, and an access mechanism.

13. The system of claim 12, wherein:
the link request is transmitted by the remote device manually, and
a user intentionally causes the remote device to transmit the link request.

14. The system of claim 12, wherein the link request is transmitted by the remote device automatically in response to user interaction with an element of a graphical user interface displayed by the remote device.

15. The system of claim 11, wherein the first application state record comprises:
application state information describing an application state associated with the first application state record, and
an access mechanism that causes the remote device to (i) launch an application associated with the first application state record, and (ii) display the application state associated with the first application state record.

16. The system of claim 15, wherein the first application state record corresponds to a different application than an application indicated by the link request.

17. The system of claim 15, wherein:
the first application state record includes a dynamic access mechanism configured to receive additional parameters associated with the link request, and
the computer-readable instructions further cause the one or more computing devices to generate a completed access mechanism based on the dynamic access mechanism and the additional parameters.

18. The system of claim 11, wherein the computer-readable instructions further cause the one or more computing devices to:
identify a first entity record of a plurality of entity records from an entity data store based on a match between the entity name of the link request and the entity name indicated by each of the plurality of entity records, wherein:
    the first entity record indicates a plurality of actions that are different than the action of the link request; and
    each of the plurality of actions corresponds with one or more related application state records; and
identify the plurality of application state records based on each of the one or more related application state records.

19. The system of claim 18, wherein the first entity record comprises:
an entity name that uniquely identifies an entity and matches the entity name of the link request,
entity information describing the entity,
an entity category,
a list of actions associated with the entity, and
a list of application state records related to the entity.

20. The system of claim 11, wherein the link result includes an access mechanism of the first application state record.

* * * * *